US010221475B2

(12) United States Patent
Foster et al.

(10) Patent No.: US 10,221,475 B2
(45) Date of Patent: Mar. 5, 2019

(54) ZIRCONIUM ALLOYS WITH IMPROVED CORROSION/CREEP RESISTANCE

(71) Applicant: WESTINGHOUSE ELECTRIC COMPANY, LLC., Cranberry Township, PA (US)

(72) Inventors: John P. Foster, Bluffton, SC (US); Robert J. Comstock, Irwin, PA (US); Andrew Atwood, Columbia, SC (US); Guirong Pan, Elgin, SC (US); Anand Garde, Columbia, SC (US); Mats Dahlback, Vasteras (SE); Jonna Partezana Mundorff, Finleyville, PA (US); Andrew J. Mueller, Elizabeth, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 408 days.

(21) Appl. No.: 14/791,934

(22) Filed: Jul. 6, 2015

(65) Prior Publication Data
US 2015/0307976 A1 Oct. 29, 2015

Related U.S. Application Data

(60) Continuation-in-part of application No. 14/745,792, filed on Jun. 22, 2015, now Pat. No. 9,725,791, which is a division of application No. 13/161,563, filed on Jun. 16, 2011, now Pat. No. 9,284,629, which is a continuation-in-part of application No. 12/697,322, filed on Feb. 1, 2010, now abandoned, which is a division of application No. 11/087,844, filed on Mar. 23, 2005, now abandoned.

(60) Provisional application No. 60/555,600, filed on Mar. 23, 2004, provisional application No. 60/564,416, filed on Apr. 22, 2004, provisional application No. 60/564,417, filed on Apr. 22, 2004, provisional application No. 60/564,469, filed on Apr. 22, 2004.

(51) Int. Cl.
| | |
|---|---|
| *C22C 16/00* | (2006.01) |
| *C22F 1/18* | (2006.01) |
| *C22F 1/00* | (2006.01) |
| *G21C 3/07* | (2006.01) |
| *C21D 7/13* | (2006.01) |
| *C21D 1/26* | (2006.01) |

(52) U.S. Cl.
CPC ............... *C22F 1/186* (2013.01); *C21D 1/26* (2013.01); *C21D 7/13* (2013.01); *C22C 16/00* (2013.01); *C22F 1/002* (2013.01); *G21C 3/07* (2013.01); *C21D 2251/00* (2013.01); *Y02E 30/40* (2013.01)

(58) Field of Classification Search
CPC ........... C22C 16/00; C22F 1/186; C22F 1/002
See application file for complete search history.

(56) References Cited

U.S. PATENT DOCUMENTS

| | | |
|---|---|---|
| 3,085,059 A | 4/1963 | Burnham, Jr. |
| 4,212,686 A | 7/1980 | Lunde et al. |
| 4,562,713 A | 1/1986 | Kondoh |
| 4,649,023 A | 3/1987 | Sabol et al. |
| 4,775,508 A | 10/1988 | Sabol et al. |
| 4,814,136 A | 3/1989 | Sabol et al. |
| 4,938,920 A | 7/1990 | Garzarolli et al. |
| 4,963,323 A | 10/1990 | Matsuo et al. |
| 4,992,240 A | 2/1991 | Komatsu et al. |
| 5,017,336 A | 5/1991 | Matsuo et al. |
| 5,023,048 A | 6/1991 | Mardon et al. |
| 5,112,573 A | 5/1992 | Foster et al. |
| 5,125,985 A | 6/1992 | Foster et al. |
| 5,211,774 A | 5/1993 | Garde et al. |
| 5,230,758 A | 7/1993 | Foster et al. |
| 5,254,308 A | 10/1993 | Garde et al. |
| 5,266,131 A | 11/1993 | Foster et al. |
| 5,341,407 A | 8/1994 | Rosenbaum et al. |
| 5,366,690 A | 11/1994 | Garde |

(Continued)

FOREIGN PATENT DOCUMENTS

| | | |
|---|---|---|
| EP | 0425465 | 5/1991 |
| EP | 1 225 243 A1 | 7/2002 |

(Continued)

OTHER PUBLICATIONS

Jung et al., "Behavior of a recrystallization in HANA-4 and HANA-6 zirconium-based alloys", Journal of Alloys and Compounds 479 (2009), pp. 423-426.

(Continued)

*Primary Examiner* — Edward M Johnson
(74) *Attorney, Agent, or Firm* — Joseph C. Spadacene; Westinghouse Electric Company LLC

(57) ABSTRACT

The invention relates to zirconium-based alloys and articles produced therefrom, such as tubing or strips, which have at least one of excellent corrosion resistance to water or steam and creep resistance at elevated temperatures in a nuclear reactor. The alloys include from about 0.2 to 1.5 weight percent niobium, from about 0.01 to 0.6 weight percent iron, from about 0.0 to 0.8 weight percent tin, from about 0.0 to 0.5 weight percent chromium, from about 0.0 to 0.3 weight percent copper, from about 0.0 to 0.3 weight percent vanadium, and from about 0.0 to 0.1 weight percent nickel with the balance at least 97 weight percent zirconium, including impurities. Further, the articles are formed by processes that include final heat treatment of (i) SRA or PRXA (0-33% RXA), or (ii) RXA or PRXA (80-100% RXA).

15 Claims, 14 Drawing Sheets

(56) References Cited

U.S. PATENT DOCUMENTS

| | | |
|---|---|---|
| 5,373,541 A | 12/1994 | Mardon et al. |
| 5,519,748 A | 5/1996 | Adamson et al. |
| 5,560,790 A | 10/1996 | Nikulina et al. |
| 5,618,356 A | 4/1997 | Adamson et al. |
| 5,620,536 A | 4/1997 | Dahlback |
| 5,648,995 A | 7/1997 | Mardon et al. |
| 5,681,404 A | 10/1997 | Adamson et al. |
| 5,805,656 A | 9/1998 | Adamson |
| 5,862,194 A | 1/1999 | Fujieda et al. |
| 5,887,045 A | 3/1999 | Mardon et al. |
| 5,912,935 A | 6/1999 | Isobe et al. |
| 5,940,464 A | 8/1999 | Mardon et al. |
| 5,972,288 A | 10/1999 | Jeong et al. |
| 5,985,211 A | 11/1999 | Jeong et al. |
| 6,014,418 A | 1/2000 | Isobe et al. |
| 6,125,161 A | 9/2000 | Isobe et al. |
| 6,261,516 B1 | 7/2001 | Jeong et al. |
| 6,514,360 B2 | 2/2003 | Jeong et al. |
| 6,544,361 B1 | 4/2003 | Diz et al. |
| 6,776,957 B1 | 8/2004 | Nikulina et al. |
| 6,811,746 B2 | 11/2004 | Jeong et al. |
| 6,863,745 B1 | 3/2005 | Charquet et al. |
| 6,902,634 B2 | 6/2005 | Jeong et al. |
| 7,292,671 B1 | 11/2007 | Dahlback et al. |
| 7,473,329 B2 | 1/2009 | Dahlback et al. |
| 7,625,453 B2 | 12/2009 | Eucken |
| 7,627,075 B2 | 12/2009 | Charquet et al. |
| 7,630,470 B2 | 12/2009 | Barberis et al. |
| 7,715,518 B2 | 5/2010 | Dahlback et al. |
| 7,738,620 B2 | 6/2010 | Barberis et al. |
| 7,763,132 B2 | 7/2010 | Barberis et al. |
| 2004/0118491 A1 | 6/2004 | Mardon et al. |
| 2006/0177341 A1 | 8/2006 | Jeong et al. |
| 2006/0225815 A1 | 10/2006 | Garzarolli et al. |
| 2006/0243358 A1 | 11/2006 | Colburn et al. |
| 2007/0153963 A1 | 7/2007 | Lutz et al. |
| 2008/0131306 A1 | 6/2008 | Jeong et al. |
| 2008/0192880 A1 | 8/2008 | Jeong et al. |
| 2009/0071579 A1 | 3/2009 | Hallstadius |
| 2009/0285350 A1 | 11/2009 | Cantonwine et al. |
| 2010/0126636 A1 | 5/2010 | Barberis et al. |
| 2010/0128834 A1 | 5/2010 | Colburn et al. |

FOREIGN PATENT DOCUMENTS

| | | | |
|---|---|---|---|
| JP | 63-213629 A | 9/1988 | |
| JP | 1-119650 A | 5/1989 | |
| WO | WO-0161062 A1 * | 8/2001 | ............. C22C 16/00 |
| WO | WO 0161062 A1 | 8/2001 | |
| WO | 2004040587 A1 | 5/2004 | |
| WO | WO 2005094504 | 10/2005 | |

OTHER PUBLICATIONS

Jung et al., "Effect of Cr on the creep properties of zirconium alloys", Journal of Nuclear Materials 396 (2010), pp. 303-306.

Shishov et al., "Structure-Phase State, Corrosion and Irradiation Properties of Zr—Nb—Fe—Sn System Alloys", Journal of ASTM International, vol. 5, No. 3, Mar. 1, 2008, pp. 1-18.

Seibold et al., "Influence of Composition and Condition on In-PWR Behavior of Zr—Sn—Nb—FeCrV Alloys", Zirconium in the Nuclear Industry: Thirteenth Symposium, ASTM STP 1423, Jan. 1, 2002, pp. 743-757.

European Patent Office, Extended European Search Report for European Application No. 16000804.1, dated Jul. 7, 2016.

Sabol et al., "Development of a Cladding Alloy for High Burnup" Zirconium in the Nuclear Industry: Eighth International Symposium, L.F. Van Swan and C.M. Euckens, Eds., American Society for Testing and Materials, ASTM STP 1023, Philadelphia, 1989. pp. 227-244.

Sabol et al., "In-reactor Corrosion Performance of ZIRLO and Zircaloy-4" Zirconium in the Nuclear Industry: Tenth International Symposium, A.M. Garde and E.R. Bradley Eds., American Society for Testing and Materials, ASTM STP 1245, Philadelphia, 1994. pp. 724-744.

Davis et al., "ASM International Handbook," vol. 2, Oct. 1990, pp. 661-669.

Mardon et al., "Influence of Composition and Fabrication Process on Out-of-Pile and In-Pile Properties of M5 Alloy," Zirconium in the Nuclear Industry, Twelfth International Symposium, ASTM STP 1354, pp. 505-522, West Conshohocken, PA 2000.

Pan et al., "Advanced Material for PWR Application: AXIOM™," Proceedings of 2010 LWR Fuel Performance/Top Fuel/WRFPM, pp. 1-9, Sep. 26-29, 2010, Orlando, FL.

Rudling et al., "Corrosion Performance of Zircaloy-2 and Zircaloy-4 PWR Fuel Cladding," Zirconium in the Nuclear Industry: Eight International Symposium, ASTM STP 1023, L. F. Van Swam and C. M. Eucken, eds. American Society for Testing and Materials, Philadelphia, 1989, pp. 213-226.

"Recrystallization (Metallurgy)" Wikipedia, http/www.en.wikipedia.org/wiki/recrystallization (metallurgy).

International Preliminary Report on Patentability for PCT/US2012/038471 dated Dec. 17, 2013 (Form PCT/IB/373, PCT/ISA/237).

Supplementary Partial European Search Report dated Nov. 4, 2014 for EP12800643.

* cited by examiner

ZIRCONIUM ALLOYS WITH IMPROVED CORROSION/CREEP RESISTANCE

CROSS-REFERENCE TO RELATED APPLICATIONS

The present application is a Continuation-in-Part (CIP) Application which claims priority from the following patent applications: U.S. patent application Ser. No. 14/745,792 filed on Jun. 22, 2015, which is a Divisional Application of U.S. patent application Ser. No. 13/161,563 filed on Jun. 16, 2011, which is a Continuation-In-Part Application of U.S. patent application Ser. No. 12/697,322, filed on Feb. 1, 2010, which is a Divisional Application of U.S. patent application Ser. No. 11/087,844, filed on Mar. 23, 2005, which claims priority from U.S. Provisional Application Ser. No. 60/555,600, filed on Mar. 23, 2004, and Provisional Application Nos. 60/564,416, 60/564,417 and 60/564,469, each filed on Apr. 22, 2004, the disclosures of all of which are incorporated herein by reference.

BACKGROUND OF THE INVENTION

1. Field of the Invention

The present invention generally relates to zirconium based alloys and their use in the formation of strips and tubing for nuclear reactor fuel assemblies. In particular, the invention relates to improving in-reactor corrosion and/or in-reactor creep of Zr—Nb based alloys by a final heat treatment. More particularly, the invention relates to improving, i.e. reducing, in-reactor corrosion by limiting or restricting the amount of iron in the alloy composition.

2. Description of the Prior Art

In the development of nuclear reactors, such as pressurized water reactors and boiling water reactors, fuel designs impose significantly increased demands on all of the fuel components, such as cladding, grids, guide tubes, and the like. Such components are conventionally fabricated from zirconium-based alloys commercially known as ZIRLO, corrosion resistant alloys that contain about 0.5-2.0 wt. % Nb; 0.9-1.5 wt. % Sn; and 0.09-0.11 wt. % of a third alloying element selected from Mo, V, Fe, Cr, Cu, Ni, or W, with the remainder Zr, as taught in U.S. Pat. No. 4,649,023 (Sabol et al.). That patent also taught compositions containing up to about 0.25 wt. % of the third alloying element, but preferably about 0.1 wt. %. Sabol et al., in "Development of a Cladding Alloy for High Burnup" *Zirconium in the Nuclear Industry: Eighth International Symposium*, L. F. Van Swan and C. M. Eucken, Eds., American Society for Testing and Materials, ASTM STP 1023, Philadelphia, 1989. pp. 227-244, reported improved properties of corrosion resistance for ZIRLO (0.99 wt. % Nb, 0.96 wt. % Sn, 0.10 wt. % Fe, remainder primarily zirconium) relative to Zircaloy-4.

There have been increased demands on such nuclear core components, in the form of longer required residence times and higher coolant temperatures, both of which increase alloy corrosion. These increased demands have prompted the development of alloys that have improved corrosion and hydriding resistance, as well as adequate fabrication and mechanical properties. Further prior art in this area include U.S. Pat. Nos. 5,940,464; 6,514,360 (Mardon et al. and Jeong et al.) and Reexamination Certificate U.S. Pat. No. 5,940,464 C1 (both Mardon et al.), and the technical paper "Advanced Cladding Material for PWR Application: AXIOM™", Pan et al., *Proceedings of 2010 LWR Fuel Performance/Top Fuel/WRFPM*, Orlando, Fla. Sep. 26-29, 2010 ("technical paper"), Mardon et al. taught zirconium alloy tubes for forming the whole or outer portion of a nuclear fuel cladding or assembly guide tube having a low tin composition: 0.8-1.8 wt. % Nb; 0.2-0.6 wt. % Sn, 0.02-0.4 wt. % Fe, with a carbon content of 30-180 ppm, a silicon content of 10-120 ppm and an oxygen content of 600-1800 ppm, with the remainder Zr. Jeong et al. taught a niobium-containing zirconium alloy for high burn-up nuclear fuel application containing Nb, Sn, Fe, Cr, Zr with optional addition of Cu. The Pan et al. "technical paper" includes alloys listed as X1, X4, X5, X5A, but only generally describes the actual composition weight percentages. Pan et al. reports tensile strength, elongation and creep test data, and shows micrographs and in-reactor corrosion and oxide thickness data.

Aqueous corrosion in zirconium alloys is a complex, multi-step process. Corrosion of the alloys in reactors is further complicated by the presence of an intense radiation field which may affect each step in the corrosion process. In the early stages of oxidation, a thin compact black oxide film develops that is protective and retards further oxidation. This dense layer of zirconia exhibits a tetragonal crystal structure which is normally stable at high pressure and temperature. As the oxidation proceeds, the compressive stresses in the oxide layer cannot be counterbalanced by the tensile stresses in the metallic substrate and the oxide undergoes a transition. Once this transition has occurred, only a portion of the oxide layer remains protective. The dense oxide layer is then renewed below the transformed oxide. A new dense oxide layer grows underneath the porous oxide. Corrosion in zirconium alloys is characterized by this repetitive process of growth and transition. Eventually, the process results in a relatively thick outer layer of non-protective, porous oxide. There have been a wide variety of studies on corrosion processes in zirconium alloys. These studies range from field measurements of oxide thickness on irradiated fuel rod cladding to detailed micro-characterization of oxides formed on zirconium alloys under well-controlled laboratory conditions. However, the in-reactor corrosion of zirconium alloys is a complicated, multi-parameter process. No single theory has yet completely defined it.

Corrosion is accelerated in the presence of lithium hydroxide and pressurized water reactor (PWR) coolant contains lithium. Thus, it is desired to limit or preclude acceleration of corrosion due to concentration of lithium in the oxide layer. U.S. Pat. Nos. 5,112,573 and 5,230,758 (both Foster et al.) taught an improved ZIRLO composition that was economically produced and provided an easily controlled composition while maintaining corrosion resistance similar to previous ZIRLO compositions. It contained 0.5-2.0 wt. % Nb; 0.7-1.5 wt. % Sn; 0.07-0.14 wt. % Fe and 0.03-0.14 wt. % of at least one of Ni and Cr, with the remainder Zr. This alloy had a 520° C. high temperature steam weight gain at 15 days of no greater than 633 mg/dm$^2$. U.S. Pat. No. 4,938,920 to Garzarolli teaches a composition having 0-1 wt. % Nb; 0-0.8 wt. % Sn, and at least two metals selected from iron, chromium and vanadium. However, in Garzarolli when niobium is present, tin is absent and vice versa. Therefore, does not disclose an alloy that had both niobium and tin.

Sabol et al, in "In-Reactor Corrosion Performance of ZIRLO and Zircaloy-4," *Zirconium in the Nuclear Industry: Tenth International Symposium*, A. M. Garde and E. R. Bradley Eds., American Society for Testing and Materials, ASTM STP 1245, Philadelphia 1994, pp. 724-744, demonstrated that, in addition to improved corrosion performance, ZIRLO material also has greater dimensional stability (specifically, irradiation creep and irradiation growth) than Zircaloy-4. More recently, U.S. Pat. No. 5,560,790 (Nikulina et al.) taught zirconium-based materials having high tin contents where the microstructure contained Zr—Fe—Nb particles. The alloy composition contained: 0.5-1.5 wt. % Nb; 0.9-1.5 wt. % Sn; 0.3-0.6 wt. % Fe, with minor amounts of Cr, C, O and Si, with the remainder Zr.

While these modified zirconium based compositions are described as providing improved corrosion resistance as well as improved fabrication properties, economics have driven the operation of nuclear power plants to higher coolant temperatures, higher burn-ups, higher concentrations of lithium in the coolant, longer cycles, and longer in-core residence times that have resulted in increased corrosion for the cladding. Continuation of this trend, as burn-ups approach and exceed 70,000 MWd/MTU, will require further improvement in the corrosion properties of zirconium based alloys. The alloys of this invention provide such corrosion resistance.

Another potential mechanism for increasing corrosion resistance is through the method of forming the alloy itself. In general, to form alloy elements into a tubing or strip, ingots are conventionally vacuum melted and beta quenched, and thereafter formed into an alloy through various reductions, intermediate anneals, and final anneals, wherein the intermediate anneal temperature is typically above 1105° F. for at least one of the intermediate anneals. In U.S. Pat. No. 4,649,023 to Sabol et al., the ingots are extruded into a tube after being beta quenched and beta annealed, and thereafter alternatively cold worked in a pilger mill, and intermediately annealed at least three times. While a broad range of intermediate anneal temperatures are disclosed, the first intermediate anneal temperature is preferably 1112° F., followed by a later intermediate anneal temperature of 1076° F. The beta annealing step preferably uses temperatures of about 1750° F. Foster et al., in U.S. Pat. No. 5,230,758, determined the formability and steam corrosion for intermediate anneal temperatures of 1100° F., 1250° F., and 1350° F. An increase in intermediate anneal temperature is associated with an increase in both formability and corrosion resistance. U.S. Pat. No. 5,887,045 to Mardon et al. discloses an alloy forming method having at least two intermediate annealing steps carried out between 1184° to 1400° F.

The prior art for corrosion improvement as summarized above involves alloying element additions and different intermediate anneal temperatures, but, does not teach a final anneal heat treatment temperature. Rudling et al., in, "Corrosion Performance of Zircaloy-2 and Zircaloy-4 PWR Fuel Cladding," *Zirconium in the Nuclear Industry: Eight International Symposium*, ASTM STP 1023, L. F. Van Swam and C. M. Eucken, eds. American Society for Testing and Materials, Philadelphia, 1989, pp. 213-226, reported that Zr-4 fuel rod cladding fabricated from the same ingot with final heat treatments of stress-relieved (SRA) and fully recrystallized (RXA) exhibited similar oxide thickness corrosion (see Table 1).

TABLE 1

| Post irradiation oxide thickness of Zr-4 cladding after 1-cycle of irradiation. | |
|---|---|
| Final Heat Treatment | 4 Rod Average of the Maximum Oxide Thickness (μm) |
| SRA | 12 +/− 1 |
| RXA | 10 +/− 1 |

Foster et al., in U.S. Pat. No. 5,125,985, presents a method of controlling creep by use of a final area reduction and intermediate anneal temperature. A decrease in final area reduction decreases creep, and an increase in intermediate anneal temperature decreases creep. In different applications, the in-reactor creep may be more important than in-reactor corrosion. One such example is fuel rods containing fuel pellets coated with $ZrB_2$. $ZrB_2$ is a neutron absorber. When neutrons are absorbed, He gas is released which increases the rod internal pressure. In this case, creep resistant cladding is necessary so that the fuel/cladding gap remains closed. A closed fuel/cladding gap ensures the fuel temperatures do not increase due to the formation of a He gas gap between the fuel and cladding. In accordance with the present invention, either the cladding corrosion or the cladding in-reactor creep may be improved by the final heat treatment.

A further issue in nuclear reactors is corrosion of welds utilized in a nuclear fuel assembly. In a typical fuel rod, nuclear fuel pellets are placed within the cladding, which is enclosed by end caps on either end of the cladding, such that the end caps are welded to the cladding. The weld connecting the end caps to the cladding, however, generally exhibits corrosion to an even greater extent than the cladding itself, usually by a factor of two over non-welded metal. Rapid corrosion of the weld creates an even greater safety risk than the corrosion of non-welded material, and its protection has generally not been addressed. In addition, grids have many welds and the structural integrity depends on adequate weld corrosion resistance.

Thus, there is a need, even in this later stage of nuclear power development, for novel zirconium cladding alloys that exhibit improved corrosion resistance and improved in-reactor irradiation creep resistance over known alloys in the field, and improved welds for holding end caps on claddings and for joining grid straps that likewise exhibit increased corrosion resistance. Accordingly, an object of the present invention is to provide Zr—Nb alloys with improved corrosion resistance and/or improved in-reactor irradiation creep resistance through the selection of a specific final heat treatment and restriction of the amount of iron in the material chemical composition.

SUMMARY OF THE INVENTION

The Zr—Nb alloys of this invention have improved alloy chemistry, improved weld corrosion resistance, and improved method of formation of alloys having reduced intermediate anneal temperatures during formation of the alloys.

In one aspect, the invention provides zirconium-based alloy having one of improved corrosion resistance and improved creep resistance for use in an elevated temperature environment of a nuclear reactor, including the following alloying composition:

0.2 to 1.5 weight percent niobium,
0.01 to 0.6 weight percent iron,
0.0 to 0.8 weight percent tin,
0.0 to 0.5 weight percent chromium,
0.0 to 0.3 weight percent copper,
0.0 to 0.3 weight percent vanadium,
0.0 to 0.1 weight percent nickel, and
the balance at least 97 weight percent zirconium, including impurities. Impurities mean less than 60 ppm or 0.006 wt. %.

In another aspect, the invention provides a method of making the zirconium-based alloy that includes:

(a) combining the above alloying elements to form the alloying composition;
(b) melting the alloying composition to produce a melted alloy material,
(c) forging the melted alloy material to produce a forged alloy material,
(d) quenching the forged alloy material to produce a quenched alloy material,
(e) extruding the quenched alloy material to produce a tube-shell alloy material,
(f) pilgering the tube-shell alloy material to produce a reduced tube-shell alloy material,
(g) annealing the reduced tube-shell alloy material to produce an annealed alloy material,
(h) repeating steps (f) and (g) to produce a final alloy material, and
(i) subjecting the final alloy material to a final heat treatment selected to provide the zirconium-based alloy exhibiting one of improved corrosion resistance and improved creep resistance,
wherein for providing the zirconium-based alloy exhibiting improved corrosion resistance, the final alloy material is subjected to a final heat treatment of partial recrystallization to produce an amount of recrystallization from about 0.0% to about 33% with the remainder being stress relief annealed, and
wherein for providing the zirconium-based alloy exhibiting improved creep resistance, the final alloy material is subjected to a final heat treatment of partial recrystallization to produce an amount of recrystallization from about 80% to about 100% recrystallization with the remainder being stress relief annealed.

DESCRIPTION OF THE PREFERRED EMBODIMENTS

Figure 1:
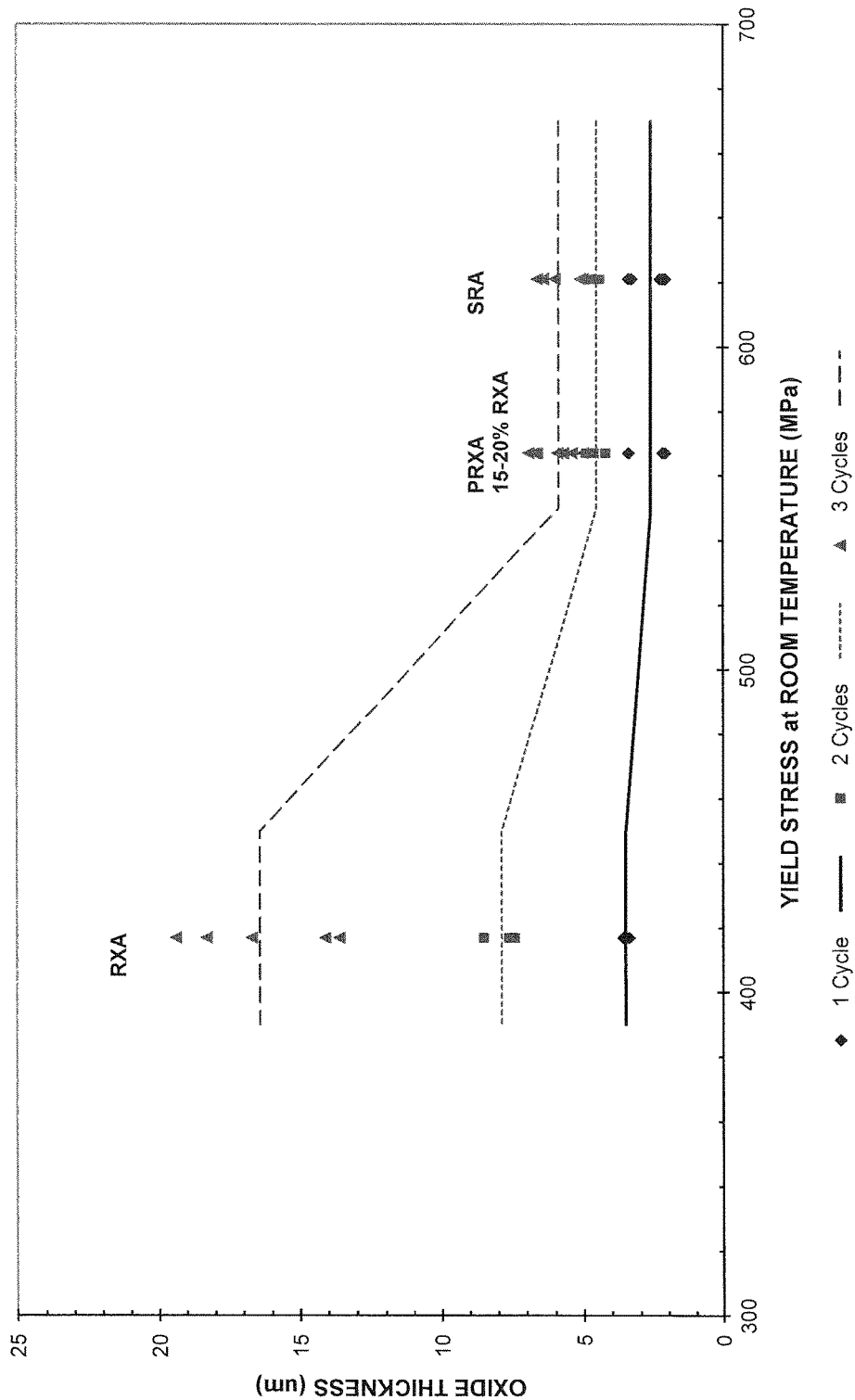
FIG. 1 is a graph showing oxide thickness due to corrosion versus room temperature yield stress and the associated final alloy microstructure of 0.77 Sn ZIRLO.

The present invention relates to alloy compositions and, the formation of strips and tubing therefrom for use in nuclear reactor fuel assemblies. In addition, the present invention provides methods for preparing the alloys and the resulting strips and tubing, such that they exhibit one of improved corrosion resistance and creep resistance. In particular, the methods of the present invention include a final heat treatment. In certain embodiments, a specific final heat treatment may be selected to produce a strip or tubing having improved corrosion resistance. In other embodiments, a specific final heat treatment may be selected to produce a strip or tubing having improved creep resistance.

The alloy compositions are zirconium-based alloys for use in an elevated temperature environment of a nuclear reactor. In certain embodiments, the alloys include from about 0.2 to about 1.5 weight percent niobium, from about 0.01 to about 0.6 weight percent iron, from about 0.0 to about 0.8 weight percent tin, from about 0.0 to about 0.5 weight percent chromium, from about 0.0 to about 0.3 weight percent copper, from about 0.0 to about 0.3 weight percent vanadium, from about 0.0 to about 0.1 weight percent nickel. The remainder of the alloy composition, i.e., at least 97 weight percent, is zirconium, including impurities. As used here, impurities mean less than about 60 ppm or about 0.006 wt. %.

In certain embodiments of the present invention, the alloy compositions are as follows.

Alloy X1: from about 0.4 to about 1.5 weight percent niobium, from about 0.05 to about 0.4 weight percent tin, from about 0.01 to about 0.1 weight percent iron, from about 0.02 to about 0.3 weight percent copper, from about 0.12 to about 0.3 weight percent vanadium, from about 0.0 to about 0.5 weight percent chromium, the balance at least 97 weight percent zirconium, including impurities.

Alloy X4: from about 0.6 to about 1.5 weight percent niobium, from about 0.02 to about 0.3 weight percent Cu, from about 0.01 to about 0.1 weight percent iron, from about 0.15 to about 0.35 weight percent chromium, the balance at least 97 weight percent zirconium, including impurities.

Alloy X5: from about 0.2 to about 1.5 weight percent niobium, from about 0.25 to about 0.45 weight percent iron, from about 0.05 to about 0.4 weight percent tin, from about 0.15 to about 0.35 weight percent chromium, from about 0.01 to about 0.1 weight percent nickel, the balance at least 97 weight percent zirconium, including impurities.

Alloy X6 (referred to commercially as Optimized ZIRLO): from about 0.4 to about 1.5 weight percent niobium, from about 0.1 to about 0.8 weight percent tin, from about 0.01 to about 0.6 weight percent iron, from about 0.0 to about 0.5 weight percent chromium, the balance at least 97 weight percent zirconium, including impurities.

In certain embodiments, Alloy X6 can include from about 0.4 to about 1.5 weight percent niobium, from about 0.6 to about 0.7 weight percent tin, from about 0.01 to about 0.3 weight percent iron, from about 0.0 to about 0.5 weight percent chromium, the balance at least 97 weight percent zirconium, including impurities. It has been found that this alloy is significantly superior to Standard ZIRLO.

Alloy X7: from about 0.4 to about 1.5 weight percent niobium, from about 0.1 to about 0.8 weight percent tin, from about 0.01 to about 0.6 weight percent iron, from about 0.0 to about 0.5 weight percent chromium, the balance at least 97 weight percent zirconium, including impurities.

In certain embodiments, Alloy X7 can include from about 0.4 to about 1.5 weight percent niobium, from about 0.35 to about 0.45 weight percent tin, from about 0.01 to about 0.3 weight percent iron, from about 0.0 to about 0.5 weight percent chromium, the balance at least 97 weight percent zirconium, including impurities. It has been found that this alloy is significantly superior to Optimized ZIRLO.

Figure 7A:
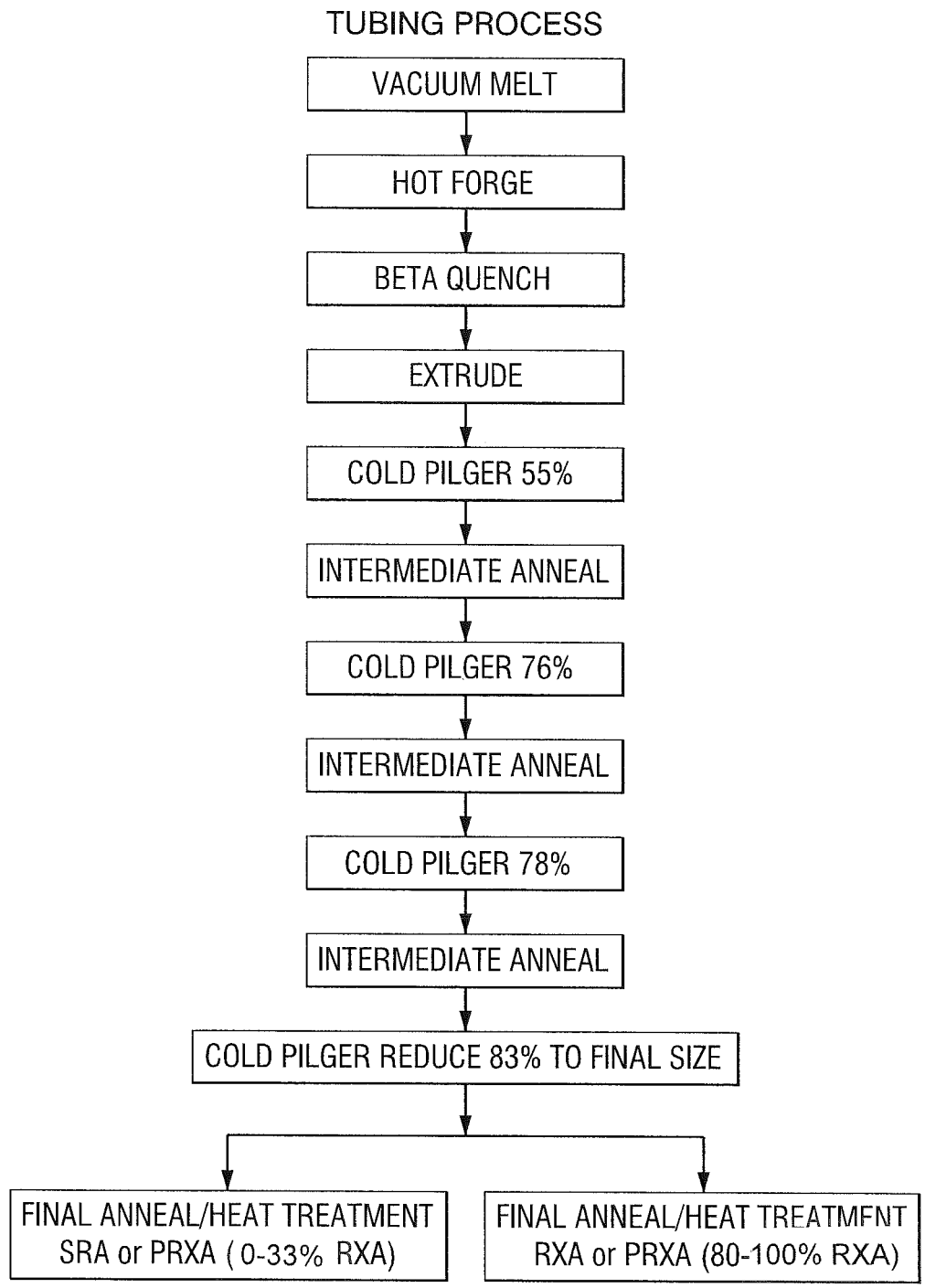
FIG. 7A is a process flow diagram of a method for forming zirconium alloy tubing, in accordance with certain embodiments of the invention.
Figure 7B:
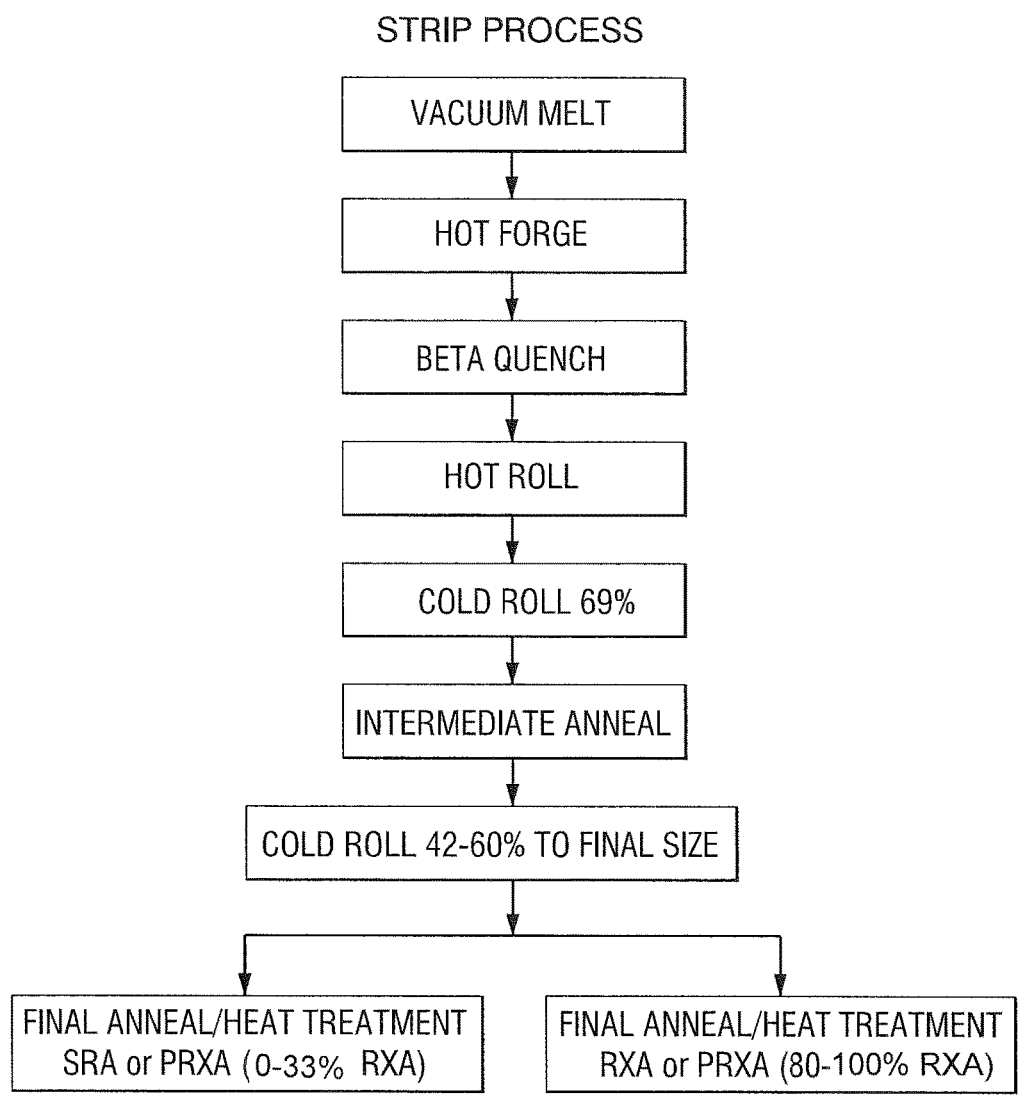
FIG. 7B is a process flow diagram of a method for forming zirconium alloy strip, in accordance with certain embodiments of the invention.

In accordance with the invention, the zirconium-based alloy compositions are fabricated to produce strips and tubing for use in elevated temperature nuclear reactors. FIG. 7A is a block diagram showing the process for fabrication of tubing and FIG. 7B is a block diagram showing the process for fabrication of strips. In FIG. 7A, the process for producing tubing includes the use of vacuum melted ingots or other like material known in the art. The ingots are vacuum melted, e.g., vacuum arc-melted from sponge zirconium with a specified amount of alloying elements, in accordance with the alloy compositions of the invention. The ingots are then forged into a material and thereafter β-quenched. β-quenching is typically done by heating the material (also known as a billet) to its β-temperature, which is from about 1273 to about 1343K. The quenching generally consists of quickly cooling the material by water. The β-quench is followed by extrusion using apparatus and techniques known in the art. Thereafter, cold working the tube-shell is performed by a plurality of cold reduction steps, e.g., cold pilger steps, alternating with a series of intermediate anneals at a set temperature. The cold reduction steps are preferably done on a pilger mill. The intermediate anneals are conducted at a temperature in the range from about 960 to about 1125° F. The material may be optionally re-β-quenched and formed into a tubing therefrom.

In certain embodiments, for tubing, extrusion is followed by initially cold reducing the alloy material in a pilger mill, conducting an intermediate anneal at a temperature from about 1030 to about 1125° F., performing a second cold reducing step and a second intermediate anneal within a temperature range from about 1030° to about 1070° F., and performing a third cold reducing step and a third intermediate anneal within a temperature range from about 1030° to 1070° F. The reducing step prior to the first intermediate anneal is a tube reduced extrusion (TREX), which reduces, preferably, the tubing about 55%. Subsequent reductions reduce, preferably, the tube about 70-80%, to produce a final size.

Each reduction pass on the pilger mill, preferably, reduces the alloy material being formed by at least 51%. The alloy material then, preferably, undergoes a final cold reduction. The alloy material is then processed with a final anneal at temperatures from about 800 to about 1300° F.

As shown in FIG. 7B, the process to produce strip includes the use of vacuum melted ingots or other like material. The ingots are vacuum melted, e.g., vacuum arc-melted from sponge zirconium with a specified amount of alloying elements, in accordance with the alloy compositions of the invention. The ingots are then hot forged into an alloy material of rectangular cross-section and thereafter β-quenched, The β-quenched alloy material is subjected to hot rolling and then cold working by one or a plurality of cold rolling and intermediate anneal steps. The intermediate anneal is conducted at a temperature from about 960 to about 1105° F. The alloy material then, preferably, goes through a final pass and anneal, wherein the final anneal temperature is in the range from about 800 to about 1300° F.

In certain embodiments, for producing strips, an intermediate anneal temperature within a range from about 1030 to about 1070° F. is employed. Further, the pass on the mill, preferably, reduces the material being formed by at least 40%, to produce a final size.

In accordance with the invention, it has been found that corrosion resistance improves with intermediate anneals that are consistently in the range of 960-1105° F., preferably around 1030-1070° F., as opposed to typical anneal temperatures that are above 1105° F. for at least one of the temperature anneals. FIGS. 8-12 show the results of a series of alloys according to certain embodiments of the invention tested for corrosion in a 680° F. water autoclave and measured for weight gain.

Further, the processes shown in FIGS. 7A and 7B for producing tubing and strips, respectively, include a final heat treatment. The final heat treatment includes conducting various amounts of annealing and recrystallization on a microstructure. The amounts of which can be specified and selected to obtain tubing or strips having one of improved corrosion resistance and improved creep resistance. The terms RXA, PRXA, SRA and combinations thereof, are used to identify the amounts of annealing and recrystallization conducted in the final heat treatment. These terms are defined as follows:

SRA—heat treatment wherein the microstructure is stress-relief annealed;

RXA—heat treatment wherein the microstructure is fully recrystallized;

PRXA (15-20% RXA)—heat treatment wherein 15-20% of the microstructure is recrystallized and 80-85% of the microstructure is stress relief annealed;

PRXA (0-33% RXA)—heat treatment wherein 0-33% of the microstructure is recrystallized and 67-100% of the microstructure is stress relief annealed;

PRXA (80-95% RXA)—heat treatment wherein 80-95% of the microstructure is recrystallized and 5-20% of the microstructure is stress relief annealed; and PRXA (80-100% RXA)—heat treatment wherein 80-100% of the microstructure is recrystallized and 0-20% of the microstructure is stress relief annealed.

As shown in FIGS. 7A and 7B, for producing tubing and strips, respectively, the heat treatment includes (i) SRA or PRXA (0-33% RXA) or (ii) RXA or PRXA (80-100% RXA). In certain embodiments, the heat treatment can include (i) SRA or PRXA (15-20%) or (ii) RXA or PRXA (80-95%).

Figure 2:
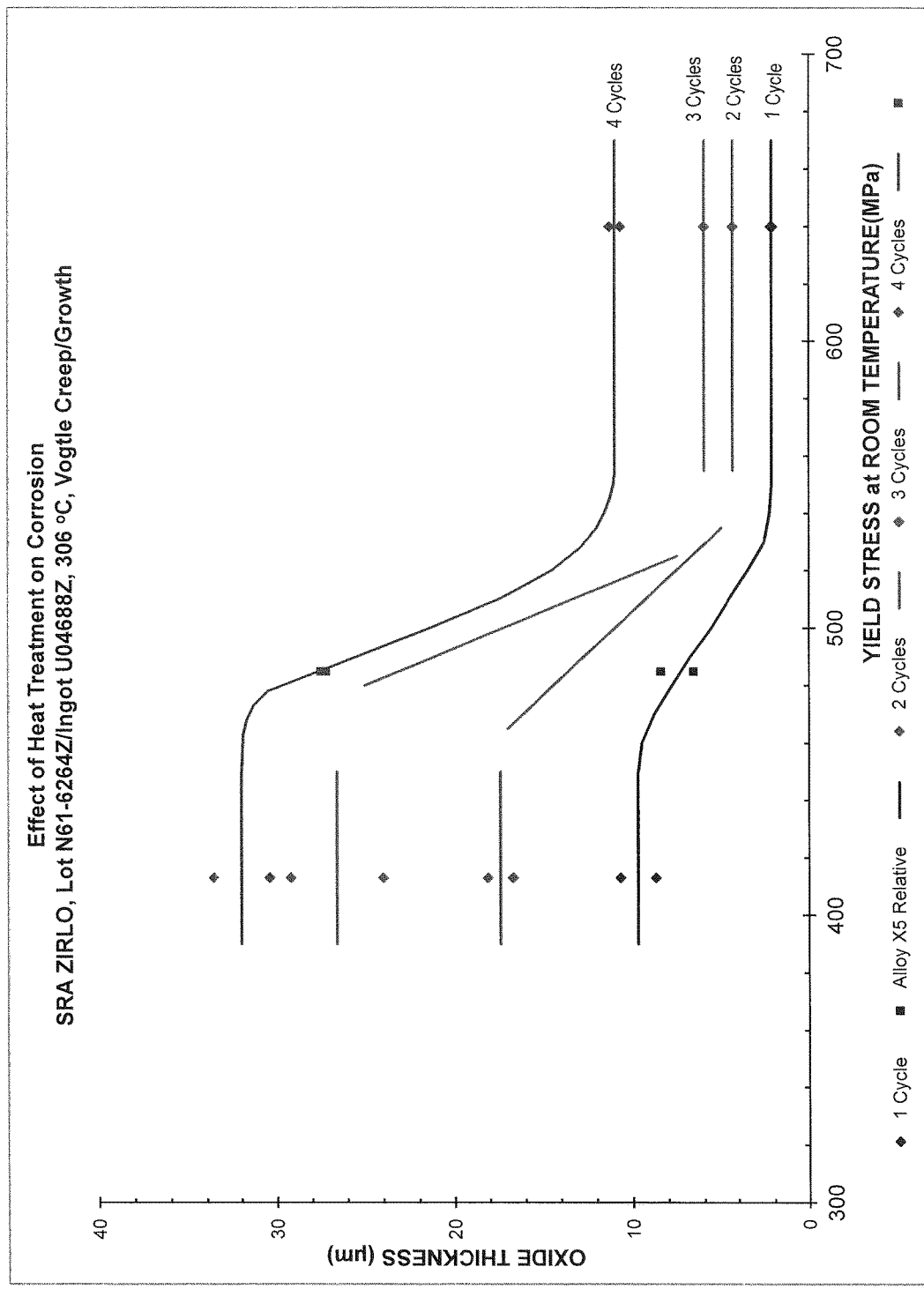
FIG. 2 is a graph showing oxide thickness due to corrosion versus room temperature yield stress and the associated final alloy microstructure of ZIRLO.

FIGS. 1 and 2 are plots of yield stress at room temperature versus oxide thickness. The results in FIGS. 1 and 2 show the effect of the final heat treatment (and the final microstructure) on the in-reactor corrosion of Zr—Nb—Sn—Fe type alloys. FIG. 1 shows that the oxide thickness depends on the final heat treatment. FIG. 1 shows the in-reactor oxide thickness corrosion data for 0.77 weight % Sn ZIRLO irradiated for 1, 2 and 3 cycles in the Vogtle Unit 2 PWR. All of the cladding was fabricated from the same ingot and received identical processing except for the final heat treatment. The cladding was given three different final anneal heat treatments of stress relief annealed ("SRA", at a temperature of 870° F.), partially recrystallize annealed ("PRXA", a a temperature of 900° F.) and fully recrystallize annealed ("RXA", at a temperature of 1085° F.). Significantly lower corrosion was exhibited by cladding with both SRA and PRXA final heat treatments. The amount of recrystallization in the PRXA heat treatment was about 15-20%. This shows that significantly lower corrosion may be obtained with RXA in the range from 0.0 to 20% (that is, the range of SRA from 80% to 100%).

FIG. 2 shows in-reactor oxide thickness corrosion data for Standard ZIRLO (1.02 weight % Sn) irradiated for 1, 2, 3 and 4 cycles in the Vogtle Unit 2 PWR. In generating the data for FIG. 2, cladding was fabricated from the same ingot and received identical processing except for the final heat treatment. The cladding was given two different final anneal heat treatments of SRA and RXA. In addition, the relative oxide thickness values for Alloy X5 are presented in FIG. 2. FIG. 2 shows that the oxide thickness depends on the final heat treatment as exhibited by the 0.77 weight % Sn ZIRLO data in FIG. 1. The highest corrosion (highest oxide thickness) was exhibited by cladding with the RXA final heat treatment. Significantly lower corrosion was exhibited by cladding with the SRA final heat treatment and with RXA values or levels up to 33%.

Combining the results of FIGS. 1 and 2 shows that significantly lower corrosion may be obtained with RXA in the range of 0 to 33%. That is, SRA in the range of 67 to 100%. A SRA of 100% (or 0% RXA) corresponds to material heat treated with a stress relief anneal. A RXA of 33% corresponds to material final heat treated to a PRXA with 33% RXA (or 67% SRA).

For the strips and tubing fabricated in accordance with the present invention, improved in-reactor creep resistance can be as important as improved corrosion resistance. In-reactor creep also may be improved as a result of the final heat treatment.

Figure 3:
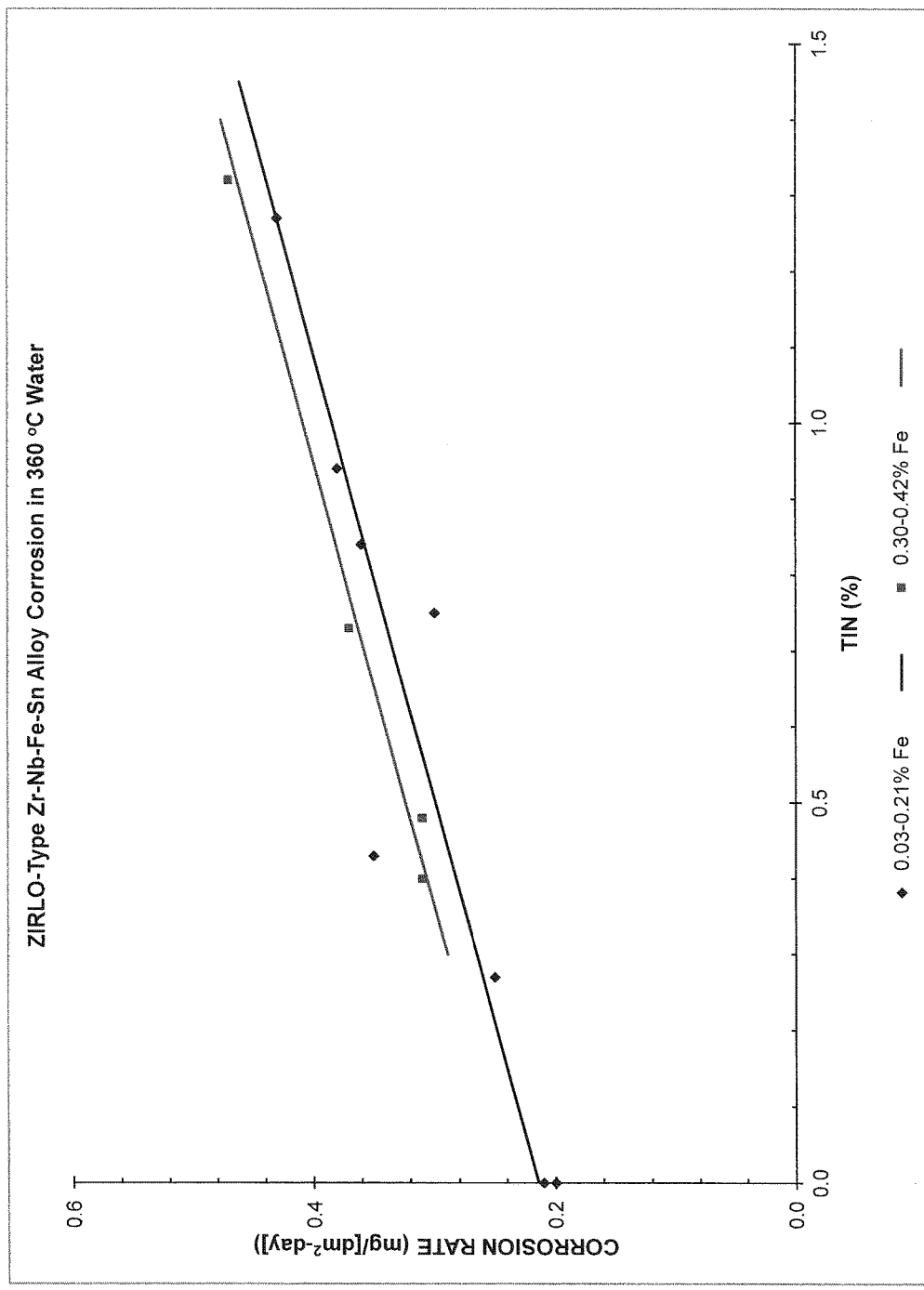
FIG. 3 is a graph showing 360° C. (680° F.) water corrosion rate versus tin content for ZIRLO-type alloys (Zr—Nb—Fe—Sn).

FIG. 3 is a plot that shows the in-reactor steady state creep rate for 0.77 weight % Sn ZIRLO irradiated for 1, 2 and 3 cycles in the Vogtle Unit 2 PWR. In FIG. 3 it is shown that the highest in-reactor creep resistance (e.g., the lowest in-reactor creep rate) is exhibited by cladding with a RXA final heat treatment. The lowest in-reactor creep resistance (e.g., the highest in-reactor creep rate) is exhibited by cladding with a SRA final heat treatment. Intermediate in-reactor creep resistance is exhibited by the PRXA final heat treatment. Thus, both SRA and PRXA are effective and RXA is shown to be more effective than SRA and PRXA.

The effect of the final heat treatment on in-reactor creep is opposite its effect on in-reactor corrosion. Therefore, cladding (e.g., strips and tubing) can be optimized for either improved in-reactor corrosion resistance or improved in-reactor creep resistance. For improving in-reactor corrosion resistance, the final heat treatment includes SRA or PRXA (0-33% RXA). For improving in-reactor creep resistance, the final heat treatment includes PRXA (80-100% RXA) or RXA.

Figure 6:
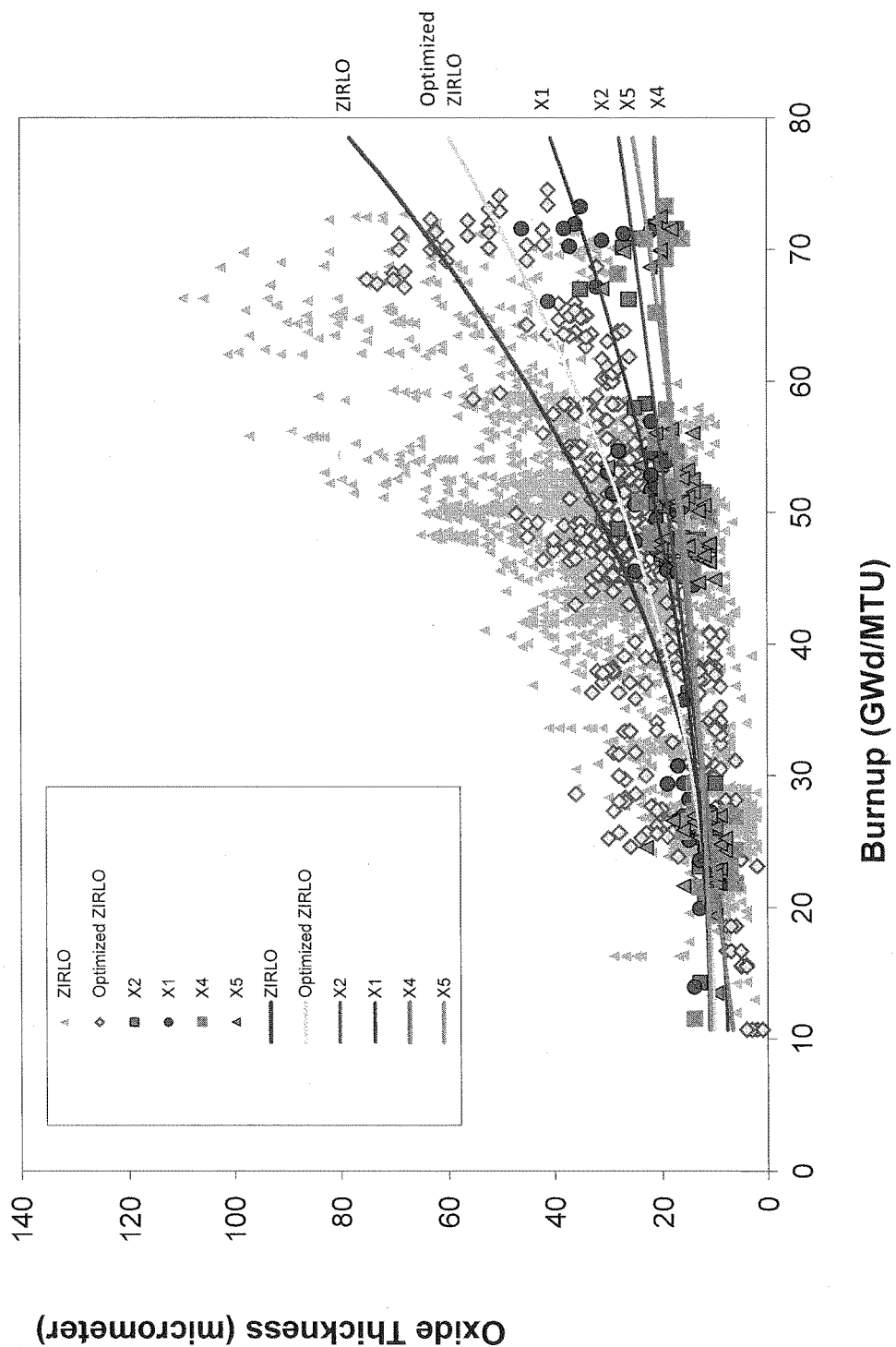
FIG. 6 is a graph showing oxide thickness due to corrosion as a function of the burn-up for Standard ZIRLO, Optimized ZIRLO (or Alloy X6) and Alloys X1, X2, X4 and X5.

FIG. 6 is a plot that shows (at 75 GWd/MTU) a range of oxide thickness from about 35-40 micrometer for Alloy X1, and a range from about 16 to 26 micrometers for Alloys X4 and X5, which are significant improvements as compared to the oxide thickness for Standard ZIRLO.

As shown in FIG. 6, a comparison of Standard ZIRLO, X4 and X5 illustrates the significant effect of tenths of weight percent elements on oxide thickness:

| Standard ZIRLO: | 0.5-2 wt % Nb; | 0.9-1.5 wt. % Sn |
| X4: | 1 wt. % Nb; | 0 wt. % Sn, etc. or |
| X5: | 0.7 wt. % Nb; | 0.3 wt. % Sn, etc. |

Minor changes in component elements provide superior improved oxide thickness. Specifically, at a burnup of 70 GWd/MTU, the oxide thickness is reduced at least by a factor of 3.5.

The final heat treatment of Alloy X1 is PRXA (~80% RXA), which is associated with maximum, improved (low) in-reactor creep resistance. In addition, note that the corrosion resistance of Alloy X1 is significantly increased relative to Standard ZIRLO, by a factor of 2.2 at a burn-up of 70 GWd/MTU (see FIG. 6), because of decreased Sn and the addition of Cu. Further, if the amount of RXA in the PRXA final heat treatment of Alloy X1 is decreased to about 15-20%, the corrosion resistance of Alloy X1 would be further improved.

The final heat treatment of Alloy X4 is PRXA (~80% RXA) which is associated with maximum improved in-reactor creep resistance. At a burn-up of 70 GWd/MTU, the corrosion resistance of Alloy X4 is increased be a factor of about 3.5 (see FIG. 6) relative to Standard ZIRLO. Note that the corrosion resistance of Alloy X4 is significantly increased relative to Standard ZIRLO because of decreased Sn and the additions of Cu and Cr. In addition, if the amount of RXA in the PRXA final heat treatment of Alloy X4 is decreased to PRXA (15-20% RXA) or PRXA (0-33% RXA), the corrosion resistance of Alloy X4 would by further improved.

The final heat treatment of Alloy X5 is PRXA (~50% RXA), which is considered to be intermediate between maximum improved in-reactor creep resistance and maximum improved in-reactor corrosion resistance. FIG. 6 shows that at a burn-up of 70 GWd/MTU, the corrosion resistance of Alloy X5 is increased be a factor of about 3.0 relative to Standard ZIRLO. Note that the corrosion resistance of Alloy X5 is significantly increased relative to Standard ZIRLO because of decreased Sn, increased Fe and the addition of Cr.

Tubing material was fabricated from the preferred embodiments of alloys in accordance with the invention, identified as Alloys X1, X4, X5 and X6, and placed in the 680° F. water autoclave. Data was available for a period of 100 days. Corrosion resistance measured in 680° F. water autoclaves for long term exposure have previously been found to correlate to corrosion resistance data of like alloys placed in-reactor. The preferred composition of these embodiments are shown in Table 2 and preferred ranges of the compositions are shown in Table 3.

TABLE 2

| Alloy | Preferred Composition, by weight percentage |
|---|---|
| X1 | Zr—0.7Nb—0.3Sn—0.12Cu—0.18V—0.05Fe |
| X1 | Zr—1.0Nb—0.3Sn—0.12Cu—0.18V—0.05Fe |
| X1 + Cr | Zr—0.7Nb—0.3Sn—0.12Cu—0.18V—0.05Fe—0.2Cr |
| X1 + Cr | Zr—1.0Nb—0.3Sn—0.12Cu—0.18V—0.05Fe—0.2Cr |
| X4 | Zr—1.0Nb—0.05Fe—0.25Cr—0.08Cu |
| X5 | Zr—0.7Nb—0.3Sn—0.3Fe—0.25Cr—0.05Ni |
| X6 | Zr—1.0Nb—0.65Sn—0.1Fe |
| X6 + Cr | Zr—1.0Nb—0.65Sn—0.1Fe—0.2Cr |
| X7 | Zr—1.0Nb—0.40Sn—0.1Fe |
| X7 + Cr | Zr—1.0Nb—0.40Sn—0.1Fe—0.2Cr |

TABLE 3

| Alloy | Preferred Composition Ranges, by weight percentage |
|---|---|
| X1 | Zr; 0.4-1.5Nb; 0.05-0.4Sn; 0.01-0.1Fe; 0.02-0.3Cu; 0.12-0.3V |
| X1 – Cr | Zr; 0.4-1.5Nb; 0.05-0.4Sn; 0.01-0.1Fe; 0.02-0.3Cu; 0.12-0.3V; 0.05-0.5Cr |
| X4 | Zr; 0.6-1.5Nb; 0.01-0.1Fe; 0.02-0.3Cu; 0.15-0.35Cr |
| X5 | Zr; 0.2-1.5Nb; 0.05-0.4Sn; 0.25-0.45Fe; 0.15-0.35Cr; 0.01-0.1Ni |
| X6 | Zr; 0.4-1.5Nb; 0.1-0.8Sn; 0.01-0.6Fe |
| X6 + Cr | Zr; 0.4-1.5Nb; 0.1-0.8Sn; 0.01-0.6Fe; 0.05-0.5Cr |
| X7 | Zr; 0.4-1.5Nb; 0.1-0.8Sn; 0.01-0.6Fe |
| X7 + Cr | Zr; 0.4-1.5Nb; 0.1-0.8Sn; 0.01-0.6Fe; 0.05-0.5Cr |

To evaluate the effect of intermediate anneal temperature on corrosion/oxidation, tubing of Standard ZIRLO and Alloys X1, X4 and X5 were processed with intermediate anneal temperatures of 1030° and 1085° F. The alloys of the invention were tested for corrosion resistance by measuring the weight gain over a period of time, wherein the weight gain is mainly attributable to an increase of oxygen (the hydrogen pickup contribution to the weight gain is relatively small and may be neglected) that occurs during the corrosion process. In general, corrosion related weight gain starts quickly and then the rate decreases with increasing time. This initial corrosion/oxidation process is termed as pre-transition corrosion. After a period of time, the corrosion rate increases, approximately linearly with time. This corrosion/oxidation phase is termed post-transition or rapid corrosion. As would be expected, alloys with greater corrosion resistance have lower corrosion rates in the pre- and post-transition phases.

Figure 8:
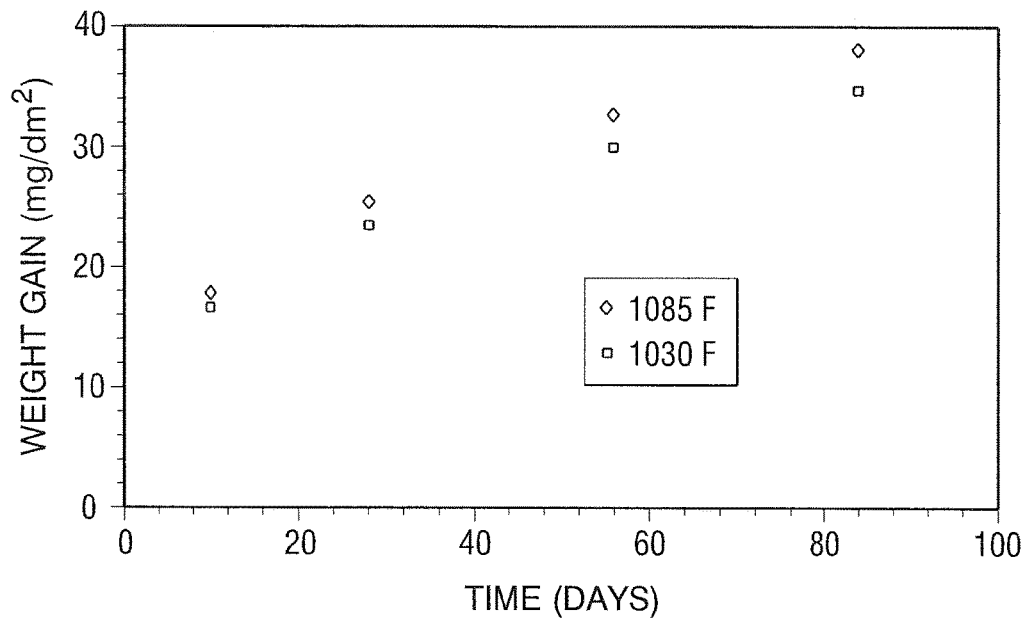
FIG. 8 is a graph showing the 680° F. water test weight gain of Standard ZIRLO as a function of autoclave exposure time for material processed with intermediate anneal temperatures of 1085° and 1030° F.
Figure 9:
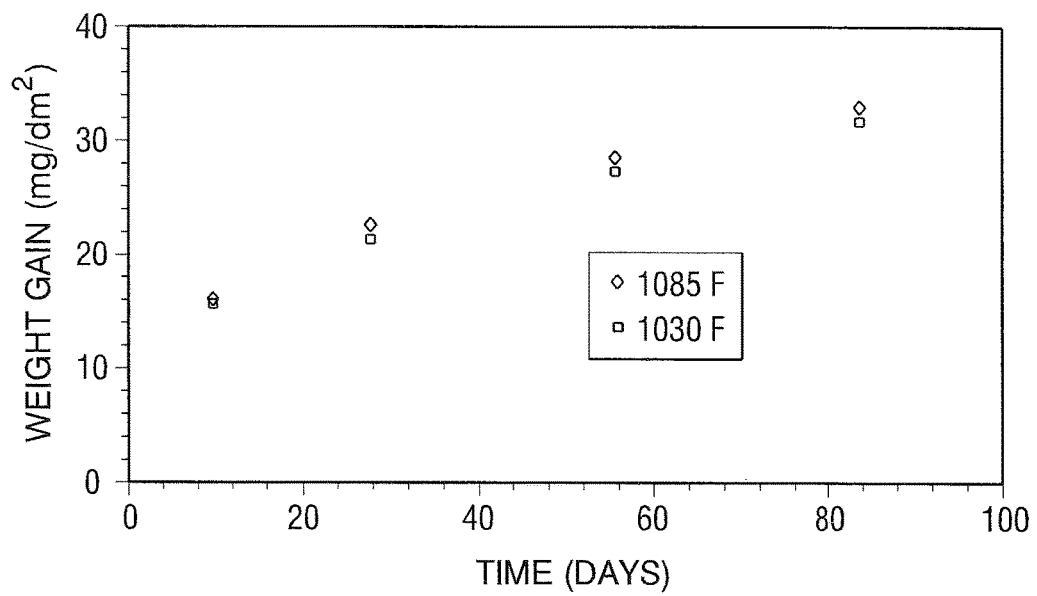
FIG. 9 is a graph showing the 680° F. water test weight gain of Alloy X1 as a function of autoclave exposure time for material processed with intermediate anneal temperatures of 1085° and 1030° F.
Figure 10:
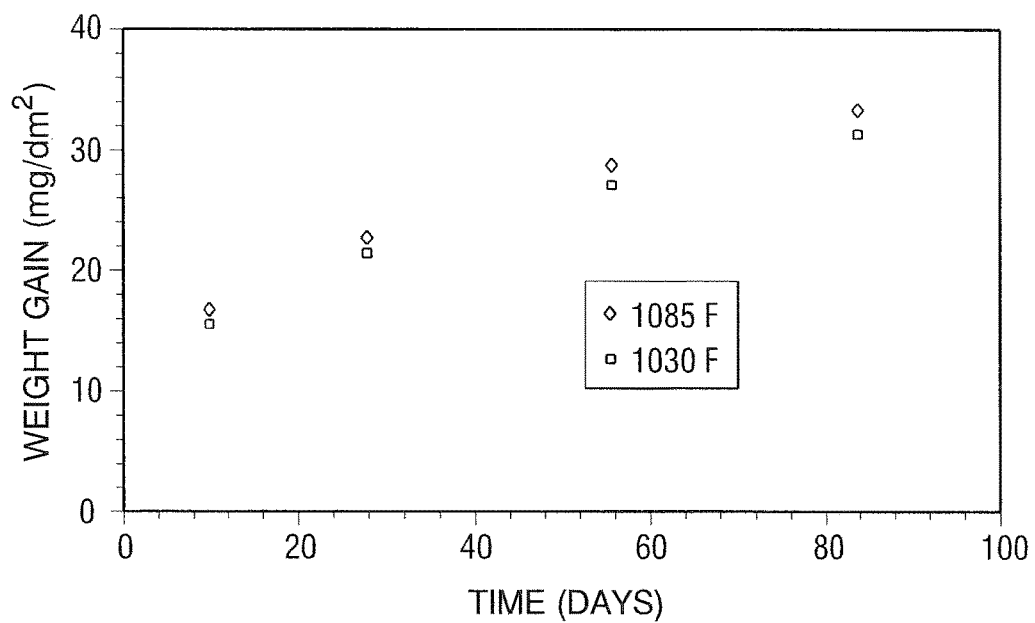
FIG. 10 is a graph showing the 680° F. water test weight gain of Alloy X4 as a function of autoclave exposure time for material processed with intermediate anneal temperatures of 1085° and 1030° F.
Figure 11:
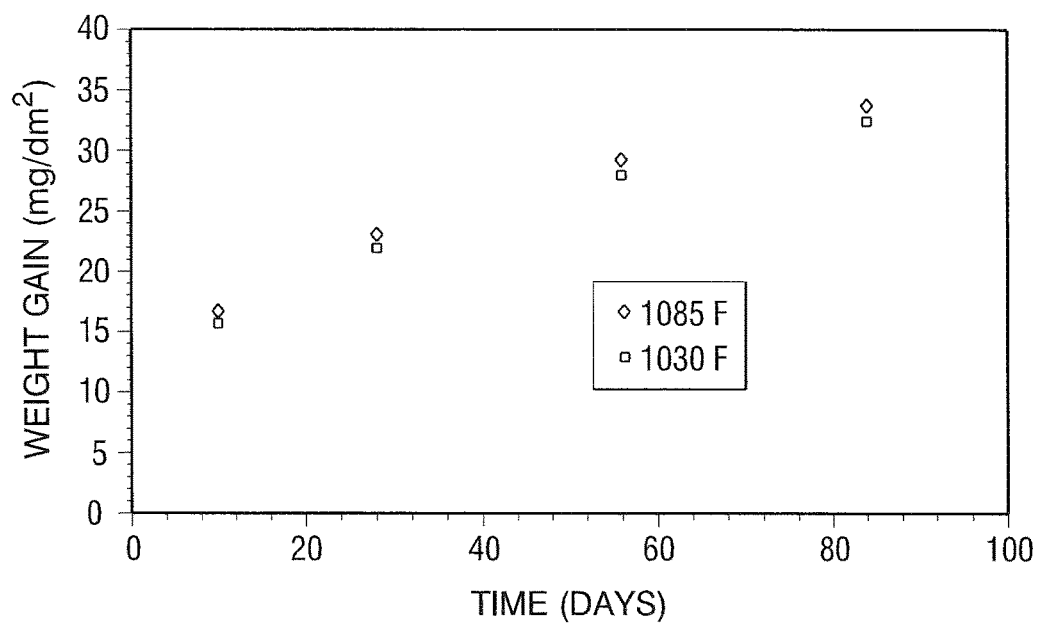
FIG. 11 is a graph showing the 680° F. water test weight gain of Alloy X5 as a function of autoclave exposure time for material processed with intermediate anneal temperatures of 1085° and 1030° F.
Figure 12:
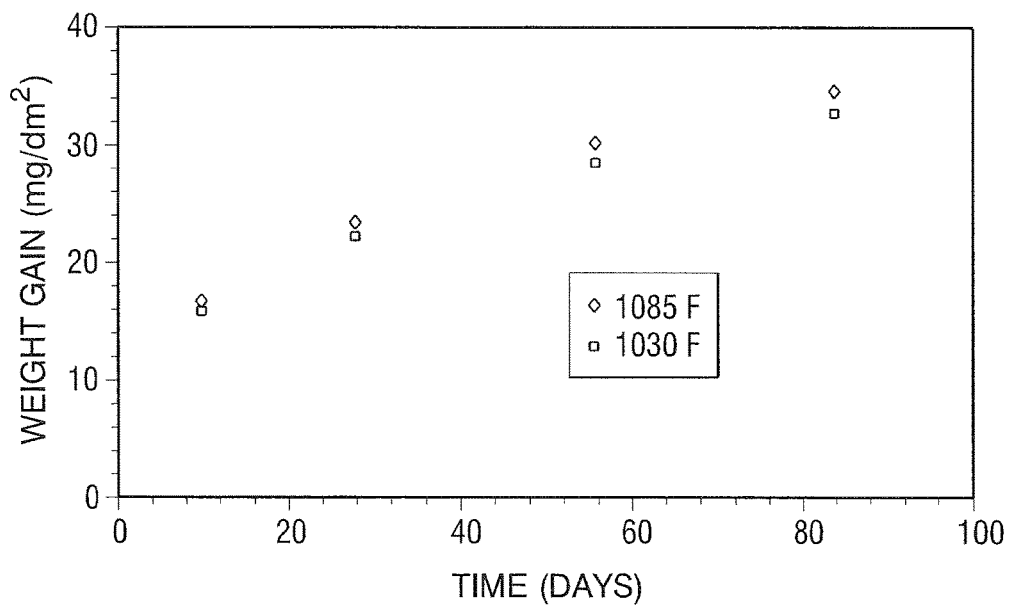
FIG. 12 is a graph showing the 680° F. water test weight gain of Alloy X6 as a function of autoclave exposure time for material processed with intermediate anneal temperatures of 1085° and 1030° F.
Figure 13:
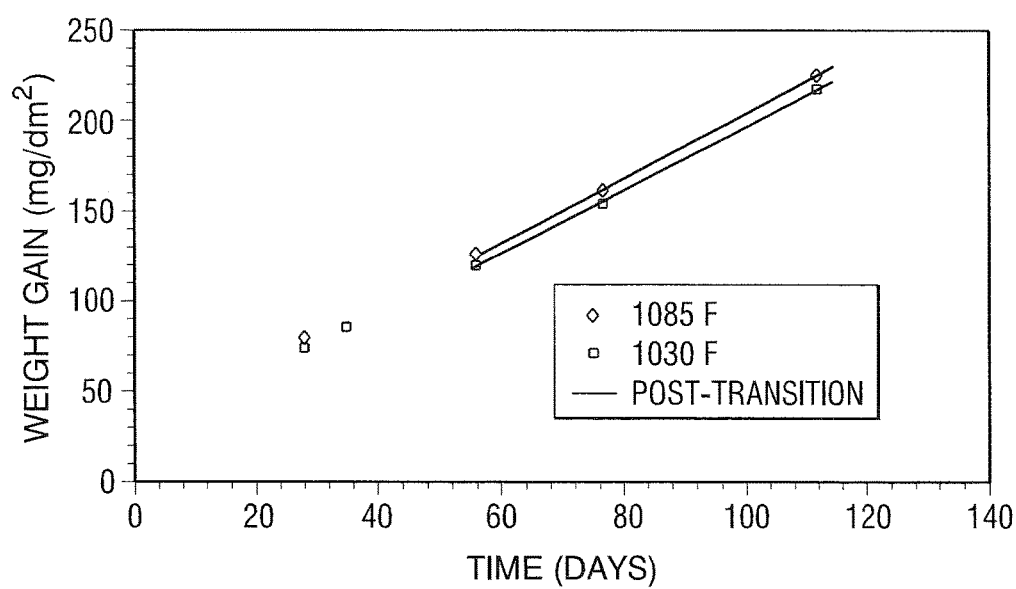
FIG. 13 is a graph showing the 800° F. steam test weight gain of Standard ZIRLO as a function of autoclave exposure time for material processed with intermediate anneal temperatures of 1085° and 1030° F.
Figure 14:
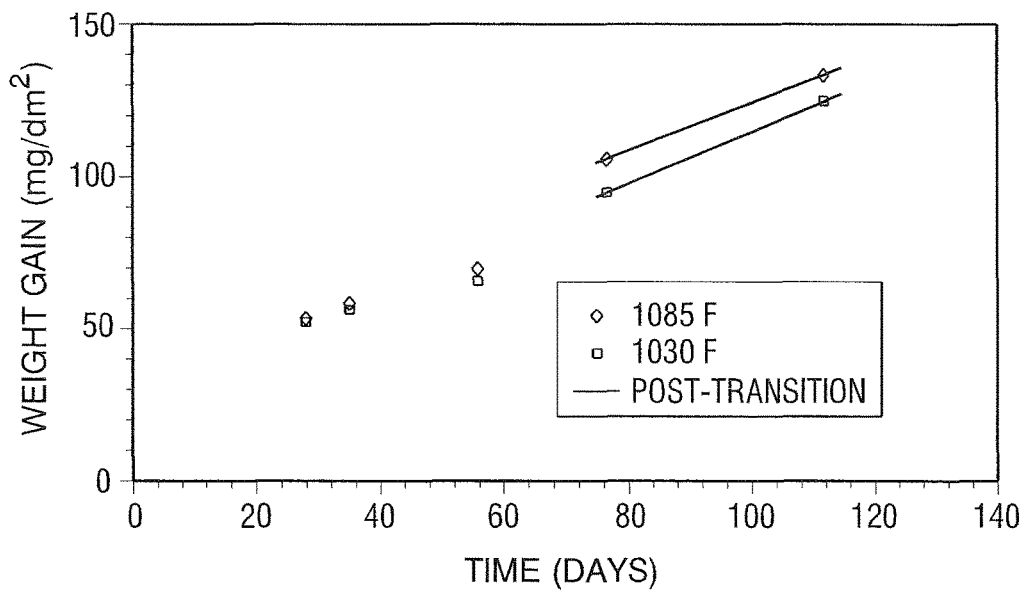
FIG. 14 is a graph showing the 800° F. steam test weight gain of Alloy X1 as a function of autoclave exposure time for material processed with intermediate anneal temperatures of 1085° and 1030° F.
Figure 15:
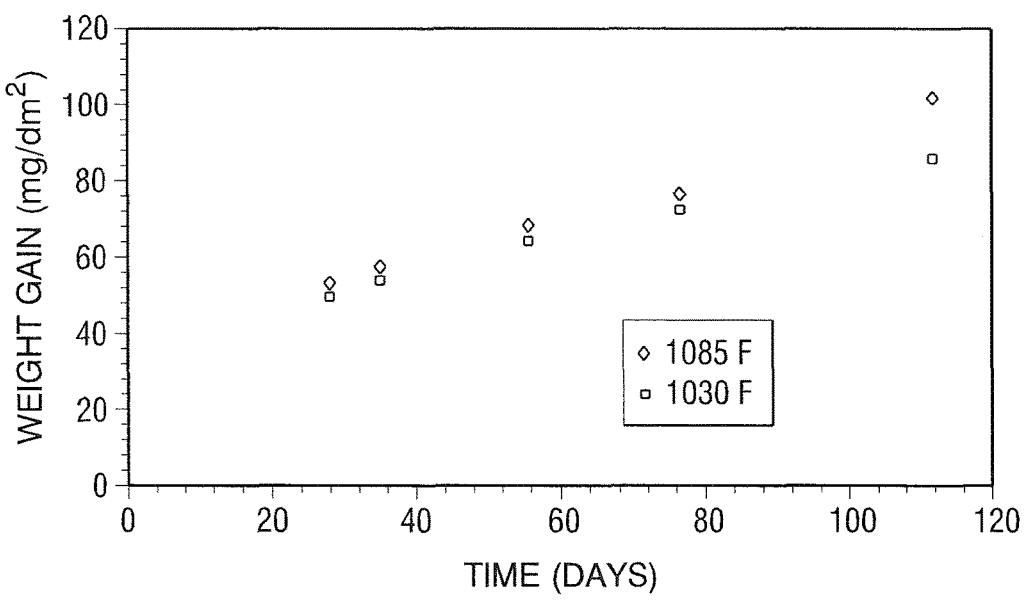
FIG. 15 is a graph showing the 800° F. steam test weight gain of Alloy X4 as a function of autoclave exposure time for material processed with intermediate anneal temperatures of 1085° and 1030° F.
Figure 16:
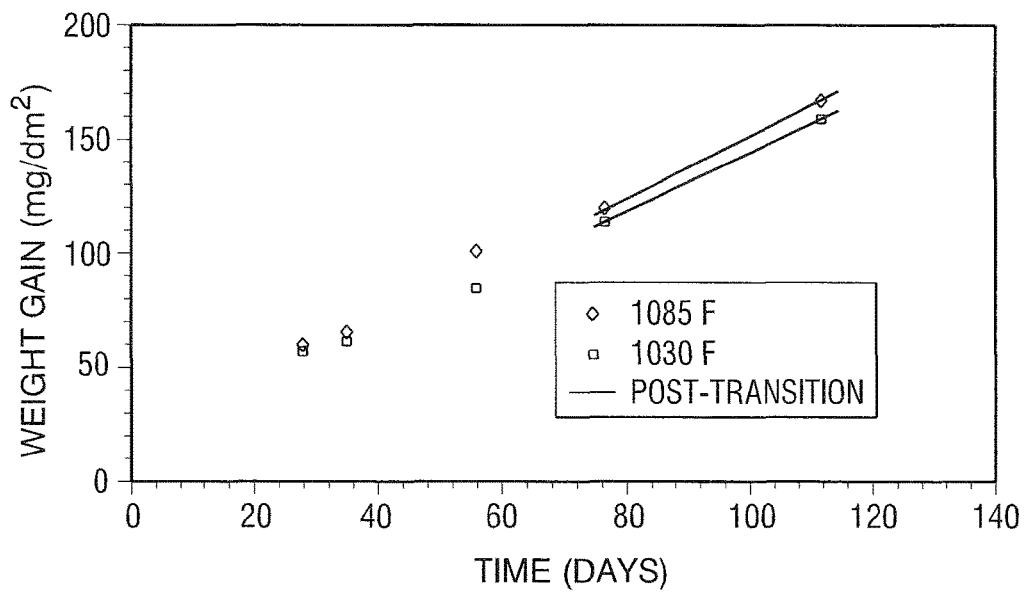
FIG. 16 is a graph showing the 800° F. steam test weight gain of Alloy X5 as a function of autoclave exposure time for material processed with intermediate anneal temperatures of 1085° and 1030° F.
Figure 17:
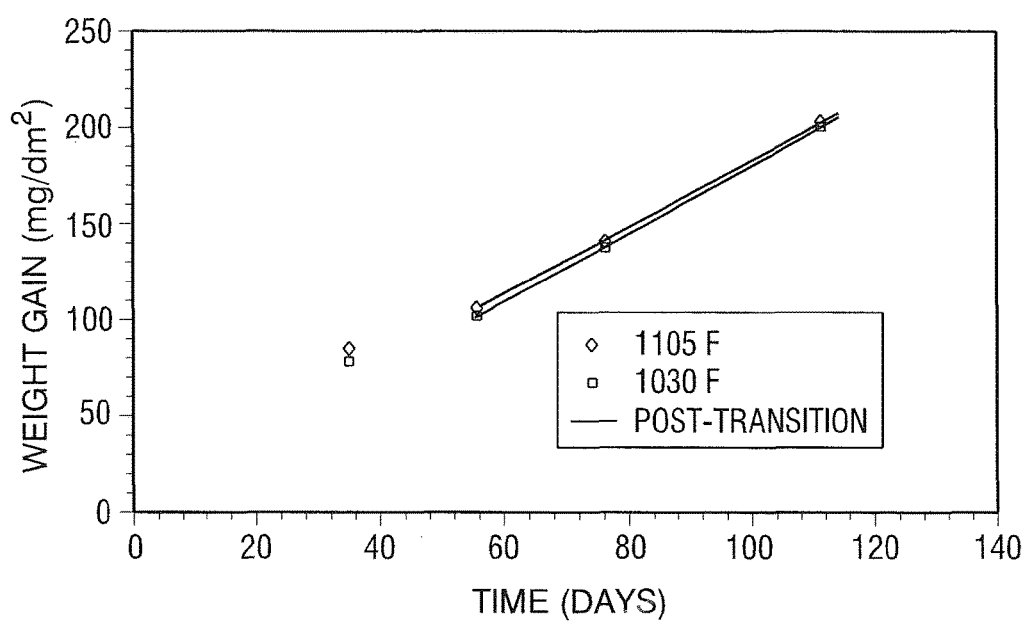
FIG. 17 is a graph showing the 800° F. steam test weight gain of Alloy X6 as a function of autoclave exposure time for material processed with intermediate anneal temperatures of 1085° and 1030° F.

FIGS. 8-12 show 680° F. water corrosion test data for Standard ZIRLO, Alloy X1, Alloy X2, Alloy X4, Alloy X5 and Alloy X6, respectively. As can be seen in FIGS. 8-12, the weight gain associated with tubing processed with 1030° F. intermediate anneal temperatures was less than for higher intermediate anneal temperatures. Further, the weight gains for Alloys X1, X4, X5 and X6 as shown in FIGS. 9-12, respectively, were less than that of Standard ZIRLO as shown in FIG. 8. Thus, as the modified alloy compositions and the lower intermediate anneal temperatures exhibit reduced weight gain, and reduced weight gain is correlated with increased corrosion resistance, increased corrosion resistance is directly correlated with the modified alloy compositions and the lower intermediate anneal temperature of the invention. The chemistry formulation of the alloys is correlated with increased corrosion resistance. All of the weight gains from the 680° F. water autoclave testing presented in FIGS. 8-12 are in the pre-transition phase. Although the improvement in the 680° F. water autoclave corrosion weight gain due to lowering of the intermediate anneal temperature appears to be small or slight in view of FIGS. 8-12, the improvement of in-reactor corrosion resistance is expected to be higher than shown by the 680° F. water autoclave data because of in-reactor precipitation of second phase particles in these Zr—Nb alloys and a thermal feedback from a lower oxide conductivity due to lower oxide thickness. Such second phase particle precipitation only occurs in-reactor and not in autoclave testing.

To evaluate the effect of intermediate anneal temperature in post-transition corrosion, an 800° F. steam autoclave test was performed, as shown in FIGS. 13-17. The test was performed for sufficient time to achieve post-transition corrosion. Post transition corrosion rates generally began after a weight gain of about 80 mg/dm$^2$. Alloys X1, X4, X5 and Standard ZIRLO were processed using intermediate anneal temperatures of 1030° and 1085° F. Alloy X6 (Optimized ZIRLO) tubing was processed using intermediate anneal temperatures of 1030° and 1105° F. The tubing was placed in an 800° F. steam autoclave for a period of about 110 days. FIGS. 13-17 for Standard ZIRLO, Alloy X1, Alloy X2, Alloy X4, Alloy X5 and Alloy X6, respectively, show that the post-transition weight gains of the alloys processed at the intermediate anneal temperature of 1030° F. are less than for alloy materials processed at the higher temperatures of 1085° or 1105° F. Further, the weight gain for Alloys X1, X4, X5 and X6 (Optimized ZIRLO) of FIGS. 14-17, respectively, are less than those of the Standard ZIRLO presented in FIG. 13. Thus, the low intermediate anneal temperatures provide substantial improvements over the prior art as it provides a significant advantage in safety, by protecting cladding or the grids from corrosion, in cost, as replacement of the fuel assemblies can be done less often, and through efficiency, as the less corroded cladding better transmits the energy of the fuel rod to the coolant.

Figure 18:
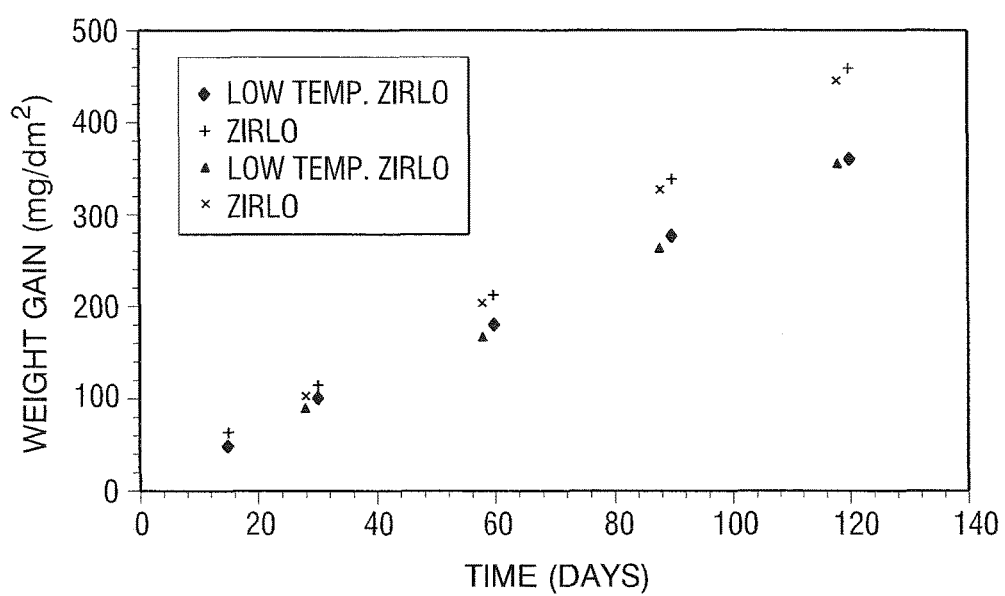
FIG. 18 is a graph comparing the 800° F. steam weight gain for Standard ZIRLO strip processed with low temperature intermediate and final anneal temperatures.

Standard ZIRLO strip was processed with intermediate anneal temperatures of 968° and 111° F. The material was tested for corrosion resistance by measuring the weight gain over a period, of time, wherein the weight gain is mainly attributable to an increase of oxygen (the hydrogen pickup contribution to the weight gain is relatively small and may be neglected) that occurs during the corrosion process. The low temperature strip was processed with an intermediate anneal temperature of 968° F. and a final anneal temperature of 1112° F. The standard strip was processed with an intermediate anneal temperature of 1112° F. and a final anneal temperature of 1157° F. FIG. 18 shows that the low temperature processed material exhibits significantly lower corrosion/oxidation than the higher temperature processed material.

The zirconium alloys of the present invention provide improved corrosion resistance through the chemistry of new alloy combinations. The alloys are generally formed into cladding (to enclose fuel pellets) and strip (for spacing fuel rods) for use in a water based nuclear reactor. The alloys generally include 0.2 to 1.5 weight percent niobium, 0.01 to 0.6 weight percent iron, and additional alloying elements selected from the group consisting of: 0.0 to 0.8 weight percent tin, 0.0 to 0.5 weight percent chromium, 0.0 to 0.3 weight percent copper, 0.0 to 0.3 weight percent vanadium and 0.0 to 0.1 weight percent nickel. The balances of the alloys are at least 97 weight percent zirconium, including impurities. Impurities may include about 900 to 1500 ppm of oxygen.

One embodiment, the present invention includes a zirconium alloy having, by weight percent, about 0.4-1.5% Nb, 0.05-0.4% Sn, 0.01-0.1% Fe, 0.02-0.3% Cu, 0.12- 0.3% V, 0.0-0.5% Cr and at least 97% Zr including impurities, designated as Alloy X1. This embodiment, and certain other embodiments, have no more than 0.50 wt. % additional other component elements, preferably no more than 0.30 wt. % additional other component elements, such as nickel, chromium, carbon, silicon, oxygen and the like, and with the remainder Zr. Chromium is an optional addition to Alloy X1. Wherein chromium is added to Alloy X1, the alloy is designated as Alloy X1+Cr.

Alloy X1 was fabricated into tubing and its corrosion rate was compared to that of a series of alloys likewise fabricated into tubing, including ZIRLO-type alloys and Zr—Nb compositions. The results are shown in FIG. 6. FIG. 6 shows that the in-reactor corrosion resistance of Alloy X1 is increased by a factor of 2.2 relative to Standard ZIRLO. The chemistry formulations of Alloy X1 provide substantial improvement over the prior art as it relates to corrosion resistance in a nuclear reactor.

Another embodiment of the present invention includes a zirconium alloy having, by weight percent, about, about 0.6-1.5% Nb; 0.01-0.1% Fe, 0.02-0.3% Cu, 0.15-0.35% Cr and at least 97% Zr, designated as Alloy X4. FIG. 6 shows that the in-reactor corrosion resistance of Alloy X4 is increased by a factor of 3.5 relative to Standard ZIRLO. A preferred composition of Alloy X4 has weight percent ranges for the alloy with about 1.0% Nb, about 0.05% Fe, about 0.25% Cr, about 0.08% Cu, and at least 97% Zr.

The preferred Alloy X4 was fabricated into tubing and its corrosion rate was compared with the corrosion rate of Standard ZIRLO. The chemistry formulations of Alloy X4, like Alloy X1, provides substantial improvements over the prior art as it relates to corrosion resistance in a nuclear reactor, Another embodiment of the present invention is a zirconium alloy having, by weight percent, about 0.2-1.5% Nb; 0.05-0.4% Sn, 0.25-0.45% Fe, 0.15-0.35% Cr, 0.01-0.1% Ni, and at least 97% Zr, designated as Alloy X5. This composition has no more than 0.5 wt. % additional other component elements, preferably no more than 0.3 wt. % additional other component elements, such as carbon, silicon, oxygen and the like, and with the remainder Zr.

A preferred composition of Alloy X5 has weight percent values for the alloy with about 0.7% Nb; about 0.3% Sn, about 0.35% Fe, about 0.25% Cr, about 0.05% Ni, and at least 97% Zr.

The preferred embodiment of Alloy X5 was fabricated into tubing and its corrosion rate was compared to that of a series of alloys likewise fabricated into tubing. FIG. 6 shows that the in-reactor corrosion resistance of Alloy X5 is increased by a factor of 3.0 relative to Standard ZIRLO.

The chemistry formulations of Alloy X5 provide substantial improvement over the prior art as it relates to corrosion resistance in a nuclear reactor.

Another embodiment of the invention is a low-tin ZIRLO alloy designated as Alloy X6 ("Optimized ZIRLO"). FIG. 6 shows that the corrosion in-reactor resistance of Alloy X6 is increased by a factor of 1.5 relative to Standard ZIRLO. The reduction of tin increases the corrosion resistance. In the case of the 680° F. water data (see FIG. 3) the decrease in tin is associated with a 15% decrease in the corrosion rate.

Tin, however, increases the in-reactor creep strength, and too small an amount of tin makes it difficult to maintain the desired creep strength of the alloy. Thus, the optimum tin of this alloy must balance these two factors. As a result, this embodiment is a low-tin alloy essentially containing, by weight percent, 0.4-1.5% Nb; 0.1-0.8% Sn, 0.01-0.6% Fe, and the balance at least 97% Zr, including impurities, hereinafter designated as Alloy X6. A preferred composition of Alloy X6 has weight percent ranges of about 1.0% Nb, about 0.65% Sn, about 0.1% Fe, and at least 97% Zr, including impurities.

Tin may be decreased if other alloy elements are included to replace the strengthening effect of tin. A second preferred embodiment of Alloy X6 ("Optimized ZIRLO") has generally the same weight percentages plus 0.05-0.5% Cr, designated as Alloy X6+Cr. A preferred embodiment of Alloy X6+Cr has about 1.0% Nb, about 0.65% Sn, about 0.1% Fe and about 0.2% Cr, Alloy X6 provides substantial improvements in comparison to Standard ZIRLO over the prior art as it relates to corrosion resistance in a nuclear reactor.

Another embodiment of the invention is a low-tin ZIRLO alloy designated as Alloy X7. The reduction of tin increases the corrosion resistance. In the case of the 680° F. water test (see FIG. 3) the decrease in tin from 1.0% (Standard ZIRLO) to 0.4% (Alloy X7) is associated with a 27% decrease in the corrosion rate. Further, the decrease in tin from 0.65% (Alloy X6, Optimized ZIRLO) to 0.4% (Alloy X7) is associated with a 13% decrease in the corrosion rate. Tin, however, increases the in-reactor creep strength, and too small an amount of tin makes it difficult to maintain the desired creep strength of the alloy. Thus, the optimum tin of this alloy must balance these two factors. As a result, this embodiment is a low-tin alloy essentially containing, by weight percent, 0.4-1.5% Nb; 0.1-0.8% Sn, 0.01-0.6% Fe, and the balance at least 97% Zr, including impurities, hereinafter designated as Alloy X7. A preferred composition of Alloy X7 has weight percent ranges of about 1.0% Nb, about 0.40% Sn, about 0.1% Fe, and at least 97% Zr, including impurities.

A second preferred embodiment of Alloy X7 has generally the same weight percentages plus 0.05-0.5% Cr, designated as Alloy X7+Cr. A preferred embodiment of Alloy X7+Cr has about 1.0% Nb, about 0.40% Sn, about 0.1% Fe and about 0.2% Cr. Alloy X7 provides substantial improvements in comparison to Standard ZIRLO and Alloy X7 (Optimized ZIRLO) over the prior art as it relates to corrosion resistance in a nuclear reactor.

Figure 4:
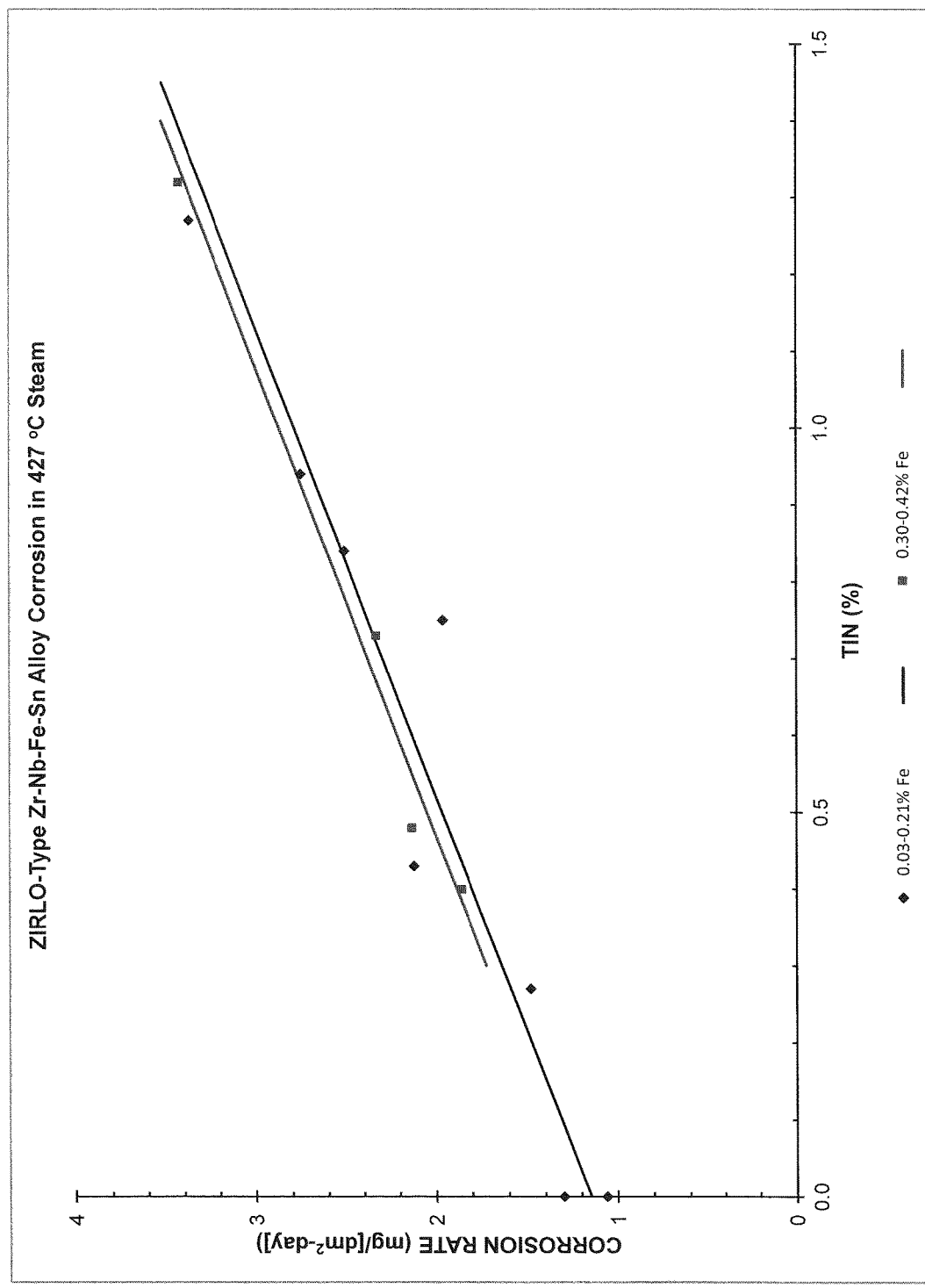
FIG. 4 is a graph showing 427° C. (800° F.) steam corrosion rate versus tin content for ZIRLO-type alloys (Zr—Nb—Fe—Sn).
Figure 5:
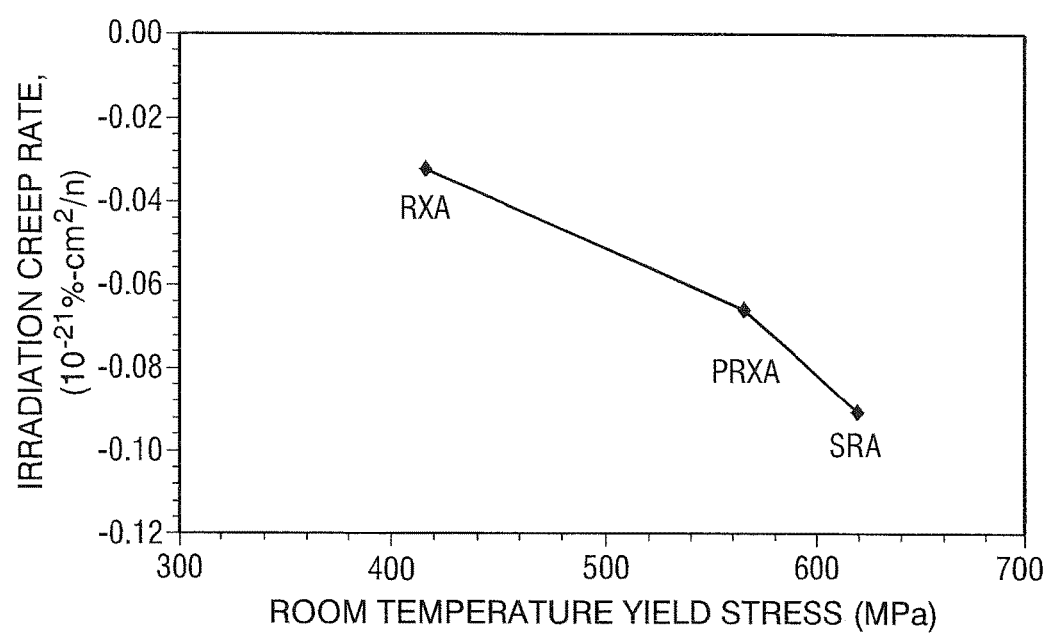
FIG. 5 is a graph showing in-reactor irradiation creep rate versus room temperature as-fabricated yield stress.

For ZIRLO-type alloys, corrosion rate tests and results have shown that decreasing tin content results in lower corrosion rates. FIGS. 3 and 4, respectively, are plots that show 680° F. water and 800° F. steam corrosion rate versus tin content. These results demonstrate, relative to Standard ZIRLO which has a nominal tin content of 1.0%, that decreasing the tin content from 1.0% to 0.65% (the tin content for Alloy X6, Optimized ZIRLO) decreases the corrosion rate. For the 680° F. water test, the tin decrease from 1.0% (Standard ZIRLO) to 0.65% (Alloy X6) is 15%. Hence, Alloy X6 has a lower corrosion rate relative to Standard ZIRLO. In addition, FIG. 6 shows for in-reactor corrosion that the oxide thickness of Optimized ZIRLO or Alloy X6 is less than Standard ZIRLO. Similarly, the results in FIGS. 3 and 4 show that decreasing tin content from either 1.0% (Standard ZIRLO) or 0.65% (Alloy X6 or Optimized ZIRLO) to 0.40% (Alloy X7) decreases the corrosion rate. For the 680° F. water test, the tin decrease from 1.0% (Standard ZIRLO) to 0.40% (Alloy X7) is 27%. The tin decrease from 0.65% (Alloy X6 or Optimized ZIRLO) to 0.4% (Alloy X7) decreases the 680° F. water corrosion rate 13%. Although no in-reactor testing was performed with Alloy X7, in FIG. 6 the oxide thickness from corrosion is expected to be intermediate between Optimized ZIRLO (0.65% Sn) and Alloy X2 (Zr-1.0Nb-0.1Fe) and therefore, the corrosion rate of Alloy X7 is lower than Standard ZIRLO or Alloy X6 (Optimized ZIRLO).

The addition of iron slightly increases the corrosion rate. FIGS. 3 and 4 show, for ZIRLO-type alloys, that when the iron content increases from the range of 0.03-0.21% to 0.30-0.42%, the corrosion rate increases. Current technology is based on test results from Zircaloy alloys, that is, Zircaloy-4, which is a Zr—Sn—Fe—Cr alloy and Zircaloy-2, which is a Zr—Sn—Fe—Cr—Ni alloy. For example, Y. Broy, F. Garzarolli, A. Seibold and L. F. Van Swam, "Influence of Transition Elements Fe, Cr, and V on Long-Time Corrosion in PWRs", Zirconium in the Nuclear Industry: Twelfth International Symposium, ASTM STP 1354, G. P. Sabol and G. D. Moan, Eds, American Society for Testing and Materials, West Conshohocken, Pa., 2000, pp. 609-622 show the benefit of iron additions to decrease the corrosion of Zr—Sn—Fe—Cr—V alloys in autoclave and in-PWR testing. Dahlback et al., "The Effect of Liner Component on Cladding Corrosion Hydriding and PCI Resistance", J. ASTM International, vol. 2, no. 9, 2005 (Paper # JA112444) shows that increasing iron is necessary to increase the corrosion resistance of Zr—Sn—Fe alloys. In contrast, FIGS. 3 and 4 show that for ZIRLO-type alloys (Zr—Nb—Sn—Fe) an increase in iron content increases the corrosion. As a result, for Alloys X6 and X7, the iron content preferably is restricted to the range of 0.01-0.3%.

Weld-Corrosion Resistance. In a typical nuclear fuel assembly large numbers of fuel rods are included. In each fuel rod nuclear fuel pellets are placed within cladding tubes that are sealed by end caps such that the end caps are welded to the cladding. The end cap-cladding weld, however, is susceptible to corrosion to an even greater extent than the non-welded cladding itself, usually by a factor of two.

Zirconium alloys that include chromium show increased weld corrosion resistance. Thus, the addition of chromium in a zirconium alloy includes substantial advancement over prior zirconium alloys that do not include chromium.

Multiplicities of alloys were tested for their effect on weld corrosion, as shown in Table 5. Several alloys were tested for their effect on laser strip welds in a 680° F. water autoclave test for an 84 day period. Some of these alloys had chromium, while the other alloys did not include chromium except in unintentional trace amounts. Still other alloy tube welds were tested in the form of magnetic force welds in an 879-day 680° F. water autoclave test. Each weld specimen placed in the two autoclave tests contained the weld and about 0.25 inches of an end plug and tube on either side of the weld. Separate same length tube specimens without the weld were also included in the test. The weight gain data were collected on the weld and tube specimens. The ratio of the weld corrosion to the non-weld corrosion was determined either from the weight gain data or the metallographic oxide thickness measurements at different locations on the specimen.

TABLE 4

| Alloy Name | Composition by weight % | Weld/Base Corrosion Ratio |
|---|---|---|
| LASER STRIP WELDS | | |
| Standard ZIRLO | Zr—0.95Nb—1.08Sn—0.11Fe | 2.07 |
| Zr—Nb | Zr—1.03Nb | 2.307 |
| Low-Sn ZIRLO | Zr—1.06Nb—0.73Sn—0.27Fe | 1.71 |
| Standard ZIRLO/590° C. RXA | Zr—0.97Nb—0.99Sn—0.10Fe | 2.094 |
| Alloy A | Zr—0.31Nb—0.51Sn—0.35Fe—0.23Cr | 1.333 |
| MAGNETIC FORCE TUBE WELDS | | |
| Optin Zr-4 | Zr—1.35Sn—0.22Fe—0.10Cr | 0.805 |
| Zr-4 + Fe | Zr—1.28Sn—0.33Fe—0.09Cr | 0.944 |
| Zr—2P | Zr—1.29Sn—0.18Fe—0.07Ni—0.10Cr | 1.008 |
| Alloy C | Zr—0.4Sn—0.5Fe—0.24Cr | 0.955 |
| Alloy E | Zr—0.4Nb—0.7Sn—0.45Fe—0.03Ni—0.24Cr | 1.168 |

As shown in Table 4, the ratios of the zirconium alloys not having chromium had a weld to base metal corrosion ratio of 1.71 or greater. In contrast, the zirconium alloys containing chromium had a maximum ratio of 1.333 or lower. The chromium additions reduce the ratio of weld corrosion relative to that of the base metal. Thus, the addition of chromium significantly reduces weld corrosion, thereby increasing the safety, cost and efficiency of the nuclear fuel assembly.

The differences in weld versus base metal corrosion may be explained by differences in vacancy concentration. The weld region is heated to high temperature during welding, and cools at a faster rate than the base material. In a typical increase of temperature, the vacancies in the metal increase exponentially with the temperature. A fraction of the atomic vacancies introduced during the temperature increase are quenched during the cooling of the weld and, as a result, the vacancy concentration is higher in the weld region. Thus, the vacancy concentration is higher in the weld than the heat affected regions of the non-weld region. Since waterside corrosion of zirconium alloys is postulated to occur by vacancy exchange with oxygen ions, increased vacancy concentration in the weld region can increase vacancy/oxygen exchange and thereby increase corrosion in the weld region if the vacancies are not pinned by an alloying element. This exchange will be reduced resulting in improvement of corrosion resistance of the weld. Due to a high solubility of chromium in beta zirconium (about 47% weight percent), chromium is an effective solid solution element to pin the vacancies in the beta phase and thereby decrease the corrosion enhancement due to oxygen ion exchange with supersaturated vacancies in the quenched weld region.

EXAMPLE

Autoclave corrosion testing was performed to identify tin chemical compositions for ZIRLO-type alloys with improved corrosion resistance relative to Standard ZIRLO, Table 5 lists the experimental alloys that were fabricated from sponge zirconium plus the designated alloy additions into 150 pound ingots and then into strip. The 150-pound ingots were large enough to permit the material to be hot worked and cold worked in much the same way as commercially processed materials. The ingots were beta-forged, beta heat treated and rapidly cooled, hot rolled in the alpha phase temperature range, and then cold rolled multiple times with intermediate alpha anneals to final size. This processing was consistent with production methods and was also suitable for precipitation of small particles by processing in the M alpha temperature range. The processing objective was to produce a microstructure containing a uniform distribution of small precipitates of beta-Nb and/or Zr—Nb—Fe particles in the zirconium matrix.

All of the twelve alloys as shown in Table 5 were ZIRLO-type alloys. The alloys all had niobium in excess of the solubility limit of about 0.6% (weight). All of the alloys were corrosion tested in pure water at 360° C. (680° F.) and pure steam at 427° C. (800° F.). The corrosion rates in units of mg/dm$^2$/day are listed in Table 5. Although several alloys had relatively high Nb contents, the higher Nb contents did not appear to affect the corrosion rates. For example, as shown in Table 5, Alloys 11 and 12 had Nb contents of 1.00 and 2.60%, respectively, and the 680 and 800° F. corrosion rates are about the same. Further, as shown in Table 5, Alloys 3 and 6 had Nb contents of 1.09 and 1.42%, respectively, and exhibited similar behavior. Hence, based on the data, it was concluded that niobium chemical compositions in the range of 0.91 to 2.60% did not affect the corrosion rate.

TABLE 5

Alloy Chemical Compositions and Corrosion Rates

| Alloy Number | Nb (%) | Fe (%) | Sn (%) | 360° C. Rate (mg/dm2/day) | 427° C. Rate (mg/dm2/day) |
| --- | --- | --- | --- | --- | --- |
| 1 | 0.91 | 0.11 | 0.94 | 0.38 | 2.75 |
| 2 | 0.92 | 0.09 | 0.84 | 0.36 | 2.51 |
| 3 | 1.09 | 0.37 | 0.73 | 0.37 | 2.33 |
| 4 | 1.00 | 0.10 | 0.75 | 0.30 | 1.96 |
| 5 | 0.94 | 0.40 | 0.40 | 0.31 | 1.86 |
| 6 | 1.42 | 0.30 | 0.48 | 0.31 | 2.13 |
| 7 | 1.33 | 0.42 | 1.32 | 0.47 | 3.43 |
| 8 | 0.95 | 0.11 | 1.27 | 0.43 | 3.37 |
| 9 | 1.98 | 0.21 | 0.27 | 0.25 | 1.48 |
| 10 | 0.93 | 0.11 | 0.43 | 0.35 | 2.12 |
| 11 | 1.00 | 0.03 | 0.00 | 0.20 | 1.06 |
| 12 | 2.60 | 0.05 | 0.00 | 0.21 | 1.30 |

While a full and complete description of the invention has been set forth, it should be understood that modifications can be resorted to without departing from the spirit hereof or the scope of the appended claims. For example, the time for the intermediate anneals can vary widely while still maintaining the spirit of the invention.

What is claimed is:

1. A zirconium-based alloy having a selected one of improved corrosion resistance and improved creep resistance based on a pre-selected forming process, in an elevated temperature environment of a nuclear reactor, consisting of an alloying composition:
    0.2 to 1.5 weight percent niobium;
    0.01 to 0.6 weight percent iron;
    0.1 to 0.8 weight percent tin;
    0.0 to 0.5 weight percent chromium;
    0.0 to 0.3 weight percent copper;
    0.0 to 0.3 weight percent vanadium;
    0.0 to 0.1 weight percent nickel; and
    a balance at least 97 weight percent zirconium, including impurities, the zirconium-based alloy formed by a process, comprising:
    (a) melting the alloying composition to produce a melted alloy material;
    (b) forging the melted alloy material to produce a forged alloy material;
    (c) quenching the forged alloy material to produce a quenched alloy material;
    (d) extruding the quenched alloy material to produce a tube-shell alloy material;
    (e) pilgering the tube-shell alloy material to produce a reduced tube-shell alloy material;
    (f) annealing the reduced tube-shell alloy material to produce an annealed alloy material;
    (g) repeating steps (e) and (f) to produce a final alloy material; and
    (h) subjecting the final alloy material to a final heat treatment selected to provide the zirconium-based alloy exhibiting one of improved corrosion resistance and improved creep resistance,
    wherein for providing the zirconium-based alloy exhibiting improved corrosion resistance, the final alloy material is subjected to a final heat treatment of partial recrystallization to produce an amount of recrystallization from about 0% to about 33% with the remainder being stress relief annealed, and
    wherein for providing the zirconium-based alloy exhibiting improved creep resistance, the final alloy material is subjected to a final heat treatment of partial recrystallization to produce an amount of recrystallization from about 80% to about 100% recrystallization with the remainder being stress relief annealed.

2. The zirconium-based alloy of claim 1, wherein said alloy is formed into an article.

3. The zirconium-based alloy of claim 2, wherein said article is cladding.

4. The zirconium-based alloy of claim 1, wherein the alloy comprises:
    0.6 to 1.5 weight percent niobium;
    0.01 to 0.1 weight percent iron;
    0.15 to 0.35 weight percent chromium;
    0.02 to 0.3 weight percent copper; and
    a balance at least 97 weight percent zirconium, including impurities.

5. The zirconium-based alloy of claim 1, wherein the alloy comprises:
    0.2 to 1.5 weight percent niobium;
    0.25 to 0.45 weight percent iron;
    0.05 to 0.4 weight percent tin;
    0.15 to 0.35 weight percent chromium;
    0.01 to 0.1 weight percent nickel; and
    a balance at least 97 weight percent zirconium, including impurities.

6. The zirconium-based alloy of claim 1, wherein the alloy comprises:
    0.4 to 1.5 weight percent niobium;
    0.01 to 0.1 weight percent iron;
    0.05 to 0.4 weight percent tin;
    0.0 to 0.5 weight percent chromium;
    0.02 to 0.3 weight percent copper;
    0.12 to 0.3 weight percent vanadium; and
    a balance at least 97 weight percent zirconium, including impurities.

7. The zirconium-based alloy of claim 6, wherein the chromium is present in an amount from 0.05 to 0.5.

8. The zirconium-based alloy of claim 1, wherein the alloy consists of:
    0.4 to 1.5 weight percent niobium;
    0.01 to 0.3 weight percent iron;

0.6 to 0.7 weight percent tin;
0.0 to 0.5 weight percent chromium; and
a balance at least 97 weight percent zirconium, including impurities.

9. The zirconium-based alloy of claim 8, wherein the chromium is present in an amount from 0.05 to 0.5.

10. The zirconium-based alloy of claim 1, wherein the alloy consists of:
0.4 to 1.5 weight percent niobium;
0.01-0.3 weight percent iron;
0.35-0.45 weight percent tin;
0.0 to 0.5 weight percent chromium; and
a balance at least 97 weight percent zirconium, including impurities.

11. A zirconium-based alloy in an elevated temperature environment of a nuclear reactor, consisting of an alloying composition:
0.2 to 1.5 weight percent niobium;
0.01 to 0.6 weight percent iron;
0.1 to 0.8 weight percent tin;
0.0 to 0.5 weight percent chromium;
0.0 to 0.3 weight percent copper;
0.0 to 0.3 weight percent vanadium;
0.0 to 0.1 weight percent nickel; and
a balance at least 97 weight percent zirconium, including impurities, the zirconium-based alloy formed by a process, comprising:
(a) melting the alloying composition to produce a melted alloy material;
(b) forging the melted alloy material to produce a forged alloy material;
(c) quenching the forged alloy material to produce a quenched alloy material;
(e) rolling the quenched alloy material to produce a rolled alloy material;
(f) annealing the rolled alloy material to produce a conditioned alloy material;
(g) repeating steps (e) and/or (f) to produce a final alloy material; and
(h) subjecting the final alloy material to a final heat treatment selected to provide the zirconium based alloy exhibiting one of improved corrosion resistance and improved creep resistance,
wherein for providing the zirconium-based alloy exhibiting improved corrosion resistance, the final alloy material is subjected to a final heat treatment of partial recrystallization to produce an amount of recrystallization from about 0% to about 33% with the remainder being stress relief annealed, and
wherein for providing the zirconium-based alloy exhibiting improved creep resistance, the final alloy material is subjected to a final heat treatment of partial recrystallization to produce an amount of recrystallization from about 80% to about 100% recrystallization with the remainder being stress relief annealed.

12. The zirconium-based alloy of claim 11, wherein said alloy is formed into an article.

13. The zirconium-based alloy of claim 12, wherein said article is strip.

14. The zirconium-based alloy of claim 11, wherein the forged alloy material has a rectangular cross-section.

15. A zirconium-based alloy, having one of improved corrosion resistance and improved creep resistance, in an elevated temperature environment of a nuclear reactor, consisting of:
0.4 to 1.5 weight percent niobium;
0.01 to 0.3 weight percent iron;
a weight percent tin weight percent tin selected from the group consisting of 0.35-0.45 and 0.6 to 0.7;
0.0 to 0.5 weight percent chromium; and
a balance at least 97 weight percent zirconium, including impurities.

* * * * *